United States Patent
Kataoka et al.

(10) Patent No.: US 9,305,171 B2
(45) Date of Patent: Apr. 5, 2016

(54) ENCRYPTION APPARATUS, ENCRYPTION METHOD, DECRYPTION APPARATUS, DECRYPTION METHOD AND SYSTEM

(71) Applicant: FUJITSU LIMITED, Kawasaki (JP)

(72) Inventors: Masahiro Kataoka, Tama (JP); Takahiro Murata, Yokohama (JP); Takafumi Ohta, Fuchu (JP); Eisuke Norimoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 702 days.

(21) Appl. No.: 13/666,376

(22) Filed: Nov. 1, 2012

(65) Prior Publication Data
US 2013/0117575 A1 May 9, 2013

(30) Foreign Application Priority Data
Nov. 4, 2011 (JP) .................................. 2011-242894

(51) Int. Cl.
G06F 21/60 (2013.01)
G06F 21/62 (2013.01)
H04L 9/16 (2006.01)

(52) U.S. Cl.
CPC .......... *G06F 21/602* (2013.01); *G06F 21/6209* (2013.01); *H04L 9/16* (2013.01); *G06F 2221/2107* (2013.01); *H04L 2209/605* (2013.01)

(58) Field of Classification Search
None
See application file for complete search history.

(56) References Cited

U.S. PATENT DOCUMENTS

| | | | | |
|---|---|---|---|---|
| 4,933,969 A * | 6/1990 | Marshall | ................. | G06F 21/64 340/5.74 |
| 2004/0120521 A1* | 6/2004 | Henson | ................. | H04L 9/0631 380/45 |
| 2005/0053232 A1* | 3/2005 | Bace | ..................... | H04L 9/0637 380/29 |
| 2007/0081668 A1* | 4/2007 | McGrew | ............... | H04L 9/0637 380/37 |
| 2008/0098024 A1 | 4/2008 | Kataoka et al. | | |
| 2009/0041234 A1* | 2/2009 | Gruba | ....................... | H04L 9/06 380/42 |
| 2010/0085222 A1 | 4/2010 | Kataoka et al. | | |
| 2012/0314857 A1* | 12/2012 | Minematsu | ........... | H04L 9/0618 380/44 |

FOREIGN PATENT DOCUMENTS

| | | |
|---|---|---|
| JP | 01-212041 | 8/1989 |
| JP | 5-130098 | 5/1993 |
| JP | 11-110504 | 4/1999 |
| JP | 2000-59355 | 2/2000 |
| JP | 2006-260224 | 9/2006 |
| JP | 2010-93414 | 4/2010 |
| WO | WO 2006/123448 | 11/2006 |

OTHER PUBLICATIONS

Japanese Office Action dated Feb. 24, 2015 in Japanese Patent Application No. 2011-242894.

* cited by examiner

*Primary Examiner* — Dede Zecher
*Assistant Examiner* — Richard McCoy
(74) *Attorney, Agent, or Firm* — Staas & Halsey LLP

(57) ABSTRACT

An encryption method includes encrypting a first portion and second portion each of which is included in data to be encrypted, encrypting first information used for decryption of the first data portion, and associating second information used for decryption of the second portion with a predetermined part of the first data portion.

14 Claims, 24 Drawing Sheets

FIG. 2

| No | ENCRYPTION ALGORITHM | KEY | BLOCK LENGTH |
|----|----------------------|-----|--------------|
| 1  | $\alpha$ | a | $n_1$ |
| 2  | $\beta$ | b | $n_2$ |
| ⋮  | ⋮ | ⋮ | ⋮ |
| Y  | $\gamma$ | c | $n_Y$ |
| ⋮  | ⋮ | ⋮ | ⋮ |

| RANKING | CHARACTER CODE | NUMBER OF TIMES OF APPEARANCE |
|---|---|---|
| 1 | a | 1068 |
| 2 | b | 1065 |
| ⋮ | ⋮ | ⋮ |

| CHARACTER DATA | NUMBER OF TIMES OF APPEARANCE | NUMBER OF APPEARANCE FILES | APPEARANCE RANKING | APPEARANCE MAP |
|---|---|---|---|---|
| A | 1238 | 230 | 102 | 10110011··· |
| ⋮ | ⋮ | ⋮ | ⋮ | ⋮ |

FIG. 11

| No | ENCRYPTION ALGORITHM | KEY | BLOCK LENGTH |
|---|---|---|---|
| E | $\alpha$ | a | $n_E$ |
| F | $\beta$ | b | $n_F$ |
| ⋮ | ⋮ | ⋮ | ⋮ |
| Y | $\gamma$ | c | $n_Y$ |
| ⋮ | ⋮ | ⋮ | ⋮ |

| No | ENCRYPTION ALGORITHM | KEY | BLOCK LENGTH |
|---|---|---|---|
| X | α | a | $n_X$ |
| Z | β | b | $n_Z$ |
| ⋮ | ⋮ | ⋮ | ⋮ |
| Y | γ | c | $n_Y$ |
| ⋮ | ⋮ | ⋮ | ⋮ |

7a

ENCRYPTION APPARATUS, ENCRYPTION METHOD, DECRYPTION APPARATUS, DECRYPTION METHOD AND SYSTEM

CROSS-REFERENCE TO RELATED APPLICATION

This application is based upon and claims the benefit of priority of the prior Japanese Patent Application No. 2011-242894, filed on Nov. 4, 2011, the entire contents of which are incorporated herein by reference.

FIELD

The embodiments discussed herein are related to at least one of encryption and decryption of data.

BACKGROUND

Heretofore, encrypted digital contents have been transmitted to user terminals such as PCs (Personal Computers), cellular phones, and so forth. Note that examples of digital contents include moving images, music, books, and dictionaries. Also, examples of a reason for encrypting digital contents include a reason for protecting a copyright.

Also, there are apparatuses which subject data to data compression using a DPCM (Differential Pulse Code Modulation) method, and encrypt the data using an encryption algorithm or encryption key which differs depending on code representing difference 0 and code representing other than difference 0 in the DPCM method.

Also, there are apparatuses which encrypt data by dividing the data into a plurality of data, and encrypt the plurality of data using multiple encryption methods respectively.

Though decryption difficulty as to encrypted data differs depending on encryption algorithms, even an encryption algorithm having decryption difficulty may be costly in encryption processing. Conversely, even an encryption algorithm that is costly in encryption processing may readily be decrypted.

SUMMARY

According to an aspect of the invention, an encryption method includes encrypting a first portion and second portion each of which is included in data to be encrypted, encrypting first information used for decryption of the first data portion, and associating second information used for decryption of the second portion with a predetermined part of the first data portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of an encryption table;
FIG. 3 illustrates an example of compression parameters;
FIG. 5 illustrates an example of an appearance map;
FIG. 11 illustrates an example of the encryption table;
FIG. 18 illustrates an example of an encryption table.

DESCRIPTION OF EMBODIMENTS

Hereinafter, description will be made in detail regarding embodiments of an encryption program, a decryption program, an encryption method, a decryption method, a system, and a content generating method which the present application discloses, with reference to the drawings. Note that these embodiments do not restrict the disclosed technology. The embodiments may be combined as appropriate in a range not conflict with processing contents.

First, a first embodiment will be described.

Figure 1:
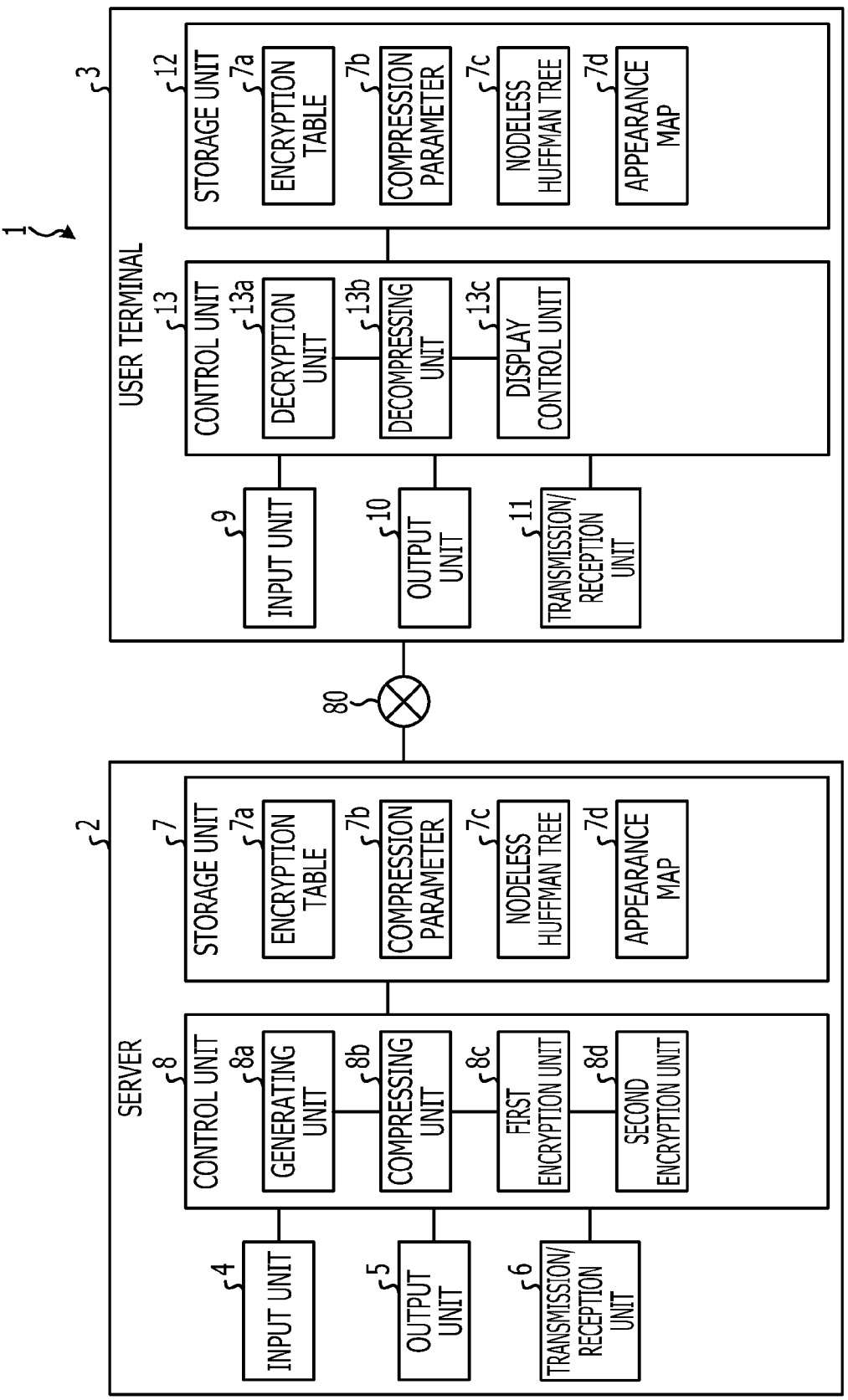
FIG. 1 illustrates an example of the configuration of a system according to a first embodiment.

A system according to the first embodiment will be described. FIG. 1 is a diagram illustrating an example of the configuration of the system according to the first embodiment. A system 1 according to the present embodiment includes a server 2 and a user terminal 3. The server 2 and user terminal 3 are connected so as to perform transmission/reception of data. With the example in FIG. 1, the server 2 and user terminal 3 are connected via the Internet 80. Note that the server 2 and user terminal 3 may be connected by wireless. The server 2 compresses data of electronic books such as multiple dictionaries in increments of blocks, encrypts each compressed block using an encryption algorithm, a key, and block length corresponding to each block, and transmits the encrypted plurality of electronic book data to the user terminal 3. The user terminal 3 decrypts the received plurality of electronic book data in increments of blocks. The user terminal 3 then searches for items including a search keyword while decompressing each decrypted block, and outputs items obtained as the search results.

The server 2 includes an input unit 4, an output unit 5, a transmission/reception unit 6, a storage unit 7, and a control unit 8.

The input unit 4 inputs various types of information to the control unit 8. For example, the input unit 4 receives instructions for executing later-described compression and encryption processing from a user, and inputs the received instructions to the control unit 8. Device examples of the input unit 4 include operation accepting devices such as a mouse, a keyboard, and so forth.

The output unit 5 outputs various types of information. For example, the output unit 5 displays the operation situation of the server 2. Device examples of the output unit 5 include display devices such as an LCD (Liquid Crystal Display), a CRT (Cathode Ray Tube) and so forth.

The transmission/reception unit 6 is a communication interface for performing communication between the server 2 and the user terminal 3. For example, upon receiving later-described encryption table 7a, compression parameters 7b, and appearance map 7d from the control unit 8, the transmission/reception unit 6 transmits the received encryption table 7a, compression parameters 7b, and appearance map 7d to the user terminal 3 via the Internet 80. Also, upon receiving an encrypted electronic book from the control unit 8, the transmission/reception unit 6 transmits the received electronic book to the user terminal 3 via the Internet 80.

The storage unit 7 stores various types of information. For example, the storage unit 7 stores encryption table 7a, compression parameters 7b, nodeless Huffman tree 7c, and appearance map 7d. In addition to these, the storage unit 7 stores multiple electronic book files.

In the event of encrypting each block divided from an electronic book file, encryption parameters are registered in the encryption table 7a, such as algorithm information indicating an encryption algorithm to be used for encryption, key information indicating a key, block length information indicating block length, and so forth. Note that the block length indicates the data size of a block to be encrypted. Also, a leaf number of a later-described nodeless Huffman tree 7c is registered in the encryption table 7a by a later-described generating unit 8a in a manner correlated with the encryption parameters. Thus, the algorithm information, key information, and block length are correlated with a character correlated with a leaf of the nodeless Huffman tree 7c.

Now, description will be made regarding an example of a combination of an encryption algorithm, a key, and block length to be registered in the encryption table 7a. For example, DES (Data Encryption Standard) may be employed as an encryption algorithm. In the event of employing this DES, encryption can be performed with a 54-bit key, and 64-bit block length. Also, triple DES may be employed as an encryption algorithm. In the event of employing this triple DES, encryption can be performed with a 54-bit key, and 64-bit block length. Also, AES (Advanced Encryption Standard) may be employed as an encryption algorithm. In the event of employing this AES, encryption can be performed with a 128, 192, or 256-bit key, and 128-bit block length. Also, RSA (Rivest Shamir Adleman) may be employed as an encryption algorithm. In the event of employing this RSA, encryption can be performed with a 65537-bit key and 1024-bit block length.

Also, EXOR (exclusive OR) may be employed as an encryption algorithm. In the event of employing this EXOR, encryption can be performed with a key of optional length, and optional block length. Also, bit transposition may be employed as an encryption algorithm. In the event of employing this bit transposition, encryption can be performed with a 4-byte key and optional block length, for example. Also, digit transposition may be employed as an encryption algorithm. In the event of employing this digit transposition, encryption can be performed with an 8-bit key and optional block length, for example. Also, byte transposition may be employed as an encryption algorithm. In the event of employing this byte transposition, encryption can be performed with a 256-byte key and optional block length, for example.

Here, DES, triple DES, AES, and RSA are high from the perspective of encryption intensity but slow from the perspective of encryption and decryption processing speed as compared to EXOR, bit transposition, digit transposition, and byte transposition. That is to say, it can be said that, with encryption, intensity and processing speed have trade-off relationship. Therefore, with the server 2, encryption algorithms for encrypting the blocks can be combined so that encryption intensity and processing speed satisfy a predetermined reference.

FIG. 2 is a diagram illustrating an example of an encryption table. The example in FIG. 2 illustrates a case where an encryption algorithm "α", a key "a", block length "$n_1$", and a leaf number "1" are correlated. Also, the example in FIG. 2 illustrates a case where an encryption algorithm "β", a key "b", block length "$n_2$", and a leaf number "2" are correlated. Also, the example in FIG. 2 illustrates a case where an encryption algorithm "γ", a key "c", block length "$n_Y$", and a leaf number "Y" are correlated.

Appearance frequencies of characters, which are used for generating the nodeless Huffman tree 7c, are registered in the compression parameters 7b. For example, as described in Japanese Laid-open Patent Publication No. 2010-93414 or the like, character codes, and the number of times of appearance of characters included in multiple electronic books are sorted in the descending order of the number of times of appearance and registered. FIG. 3 is a diagram illustrating an example of compression parameters. The example in FIG. 3 illustrates a case where the ranking of the code of "a" of which the number of times of appearance is "1068" is the first place. Also, the example in FIG. 3 illustrates a case where the ranking of the code of "b" of which the number of times of appearance is "1065" is the second place.

Figure 4:
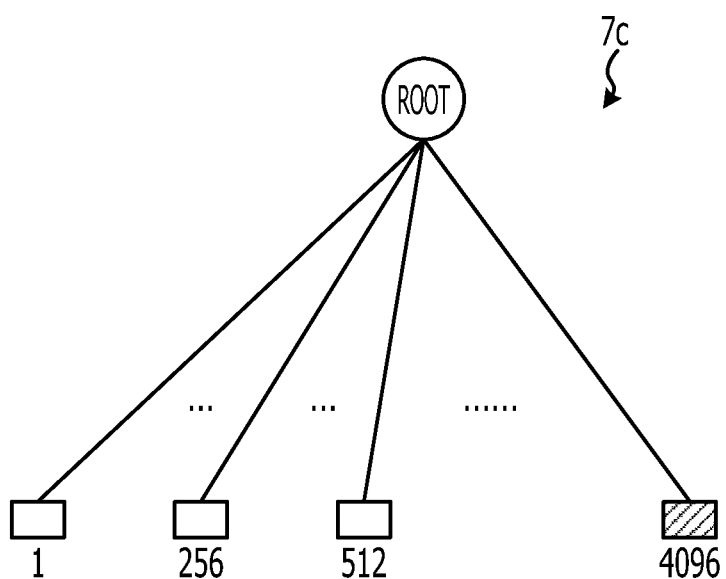
FIG. 4 illustrates an example of nodeless Huffman tree.

The nodeless Huffman tree 7C is employed for compressing/decompressing data. FIG. 4 is a diagram illustrating an example of a nodeless Huffman tree. As illustrated in FIG. 4, for example, a $2^m$-branch nodeless Huffman tree described in Japanese Laid-open Patent Publication No. 2010-93414 or the like may be employed as the nodeless Huffman tree 7c. A leaf number, compression code, compression code length, and character code are stored in a leaf of the $2^m$-branch nodeless Huffman tree in a correlated manner. In the event of compressing data using the $2^m$-branch nodeless Huffman tree, there is no internal node, and accordingly, no search is performed toward the root, compression code stored in the structure of a pointed leaf is extracted, and the extracted compression code is written in a compression buffer. The nodeless Huffman tree 7c is stored in the storage unit 7 by a later-described compressing unit 8b.

With the appearance map 7d, an appearance map including a flag indicating whether or not each of multiple characters is included in each file of multiple electronic books is generated. For example, with the appearance map 7d, as described in International Publication Pamphlet No. WO 2006/123448 or the like, character code, the number of times of appearance, the number of appearance files, the ranking of appearance, and a flag indicating whether or not a character is included in each file are registered in a correlated manner. FIG. 5 is a diagram illustrating an example of an appearance map. The example in FIG. 5 illustrates a case where, with regard to character "A", the number of times of appearance of all of the files of multiple electronic books is "1238", the number of files that have appeared is "230", and the appearance ranking is "102". Also, with the example in FIG. 5, "1" in the appearance map item indicates that character "A" is included in the corresponding file, and "0" indicates that character "A" is not included in the corresponding file. Specifically, the example in FIG. 5 illustrates that character "A" is included in the first, third, fourth, seventh, and eighth files, and character "A" is not included in the second, fifth, and sixth files.

The storage unit 7 is a semiconductor memory device such as flash memory, or a storage device such as a hard disk or optical disc, for example. Note that the storage unit 7 is not restricted to the above kinds of storage devices, and may be RAM (Random Access Memory) or ROM (Read Only Memory).

The control unit 8 includes internal memory for storing a program or control data which stipulates various types of processing procedures, and executes various types of processing using these. As illustrated in FIG. 1, the control unit 8 includes a generating unit 8a, a compressing unit 8b, a first encryption unit 8c, and a second encryption unit 8d.

The generating unit 8a obtains one character out of a character string of a block divided from an electronic book file. The generating unit 8a then obtains the number of a leaf of the nodeless Huffman tree in which the obtained character is stored. Next, the generating unit 8a generates information that correlates the obtained leaf number with encryption parameters such as an encryption algorithm, key, and block length to be used for encryption of the next block. The generating unit 8a then registers the generated information in the encryption table 7a. The generating unit 8a performs such processing on each block of each file of multiple electronic books. The generating unit 8a can employ the above-mentioned EXOR, bit transposition, digit transposition, byte transposition, DES, triple DES, AES, and RSA as an encryption algorithm to be used for encryption of the next block. Note that an encryption algorithm to be used for encryption is not restricted to these. Also, the block length of each block, and an encryption algorithm and a key which are used for encryption of each block are defined beforehand, and the generating unit 8a generates information that correlates a leaf number with encryption parameters for each block in accordance with the defined information thereof. The user can define the block length of each block, and an encryption algorithm and a key which are used for encryption of each block via the input unit 4. For example, the user can define an encryption algorithm for encrypting each block, a key, the block length of each block and so forth so that encryption intensity and processing speed satisfy a predetermined reference.

Figure 6:
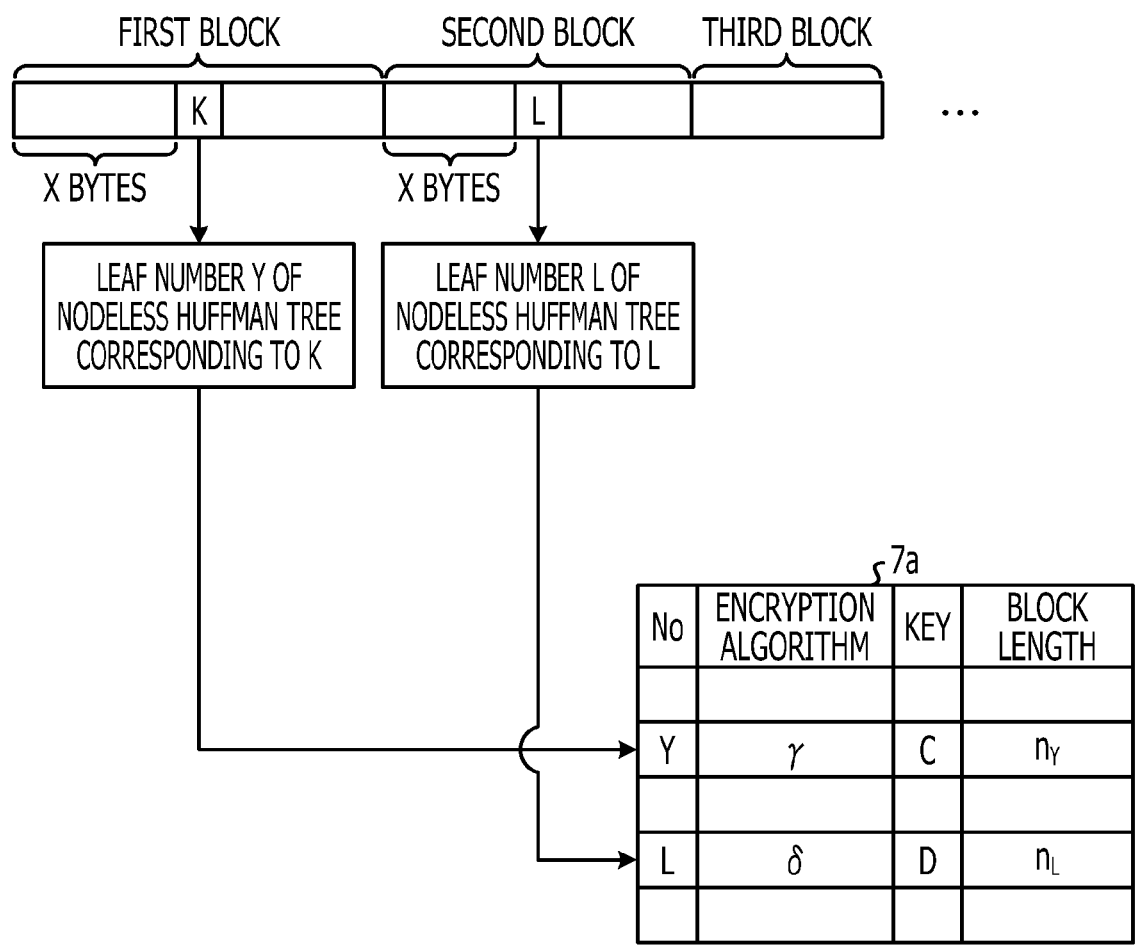
FIG. 6 illustrates an example of server processing.

FIG. 6 is a diagram for describing an example of server processing. With the example in FIG. 6, the generating unit 8a obtains a predetermined X-th byte character "K" from the beginning of the first block of an electronic book file. With the example in FIG. 6, the generating unit 8a obtains a leaf number "Y" of the nodeless Huffman tree 7c in which the character "K" is stored. Next, with the example in FIG. 6, the generating unit 8a generates information that correlates the obtained leaf number "Y" with the encryption algorithm "γ", key "Y", and block length "$n_Y$" to be used for encryption of the second block that is the next block. With the example in FIG. 6, the generating unit 8a registers the information that correlates the leaf number "Y" with the encryption algorithm "γ", key "Y", and block length "$n_Y$", in the encryption table 7a.

Also, with the example in FIG. 6, the generating unit 8a obtains the X-th byte character "L" from the beginning of the second block of an electronic book file. With the example in FIG. 6, the generating unit 8a obtains the leaf number "L" of the nodeless Huffman tree 7c in which the character "L" is stored. Next, with the example in FIG. 6, the generating unit 8a generates information that correlates the obtained leaf number "L" with an encryption algorithm "δ", key "D", and block length "$n_L$" to be used for encryption of the third block that is the next block. With the example in FIG. 6, the generating unit 8a then registers the information that correlates the leaf number "L" with an encryption algorithm "δ", key "D", and block length "$n_L$", in the encryption table 7a.

In this way, the generating unit 8a obtains a character positioned in a predetermined location of the j-th block. The generating unit 8a generates information that correlates the number of a leaf where the obtained character is stored, with encryption parameters to be used for encryption of the (j+1)-th block following the j-th block. The generating unit 8a then registers the generated information in the encryption table 7a. Here, it is difficult to recognize a leaf number corresponding to each block from each file of multiple electronic books. Therefore, it is difficult to recognize what kind of encryption parameters are used for encrypting each block of the electronic books from the registration contents of the encryption table 7a. Accordingly, even in the event that the contents of the encryption table 7a has externally been leaked, it is difficult for an attacker or the like to recognize a rule regarding what kind of encryption parameters are used for encrypting each block of the electronic books. Therefore, it is also difficult for an attacker or the like to decrypt an encrypted electronic book. Therefore, according to the generating unit 8a, interpretation of data can further be complicated.

The compressing unit 8b compresses each block divided from an electronic book file using the nodeless Huffman tree 7c. For example, the compressing unit 8b extracts, as described in Japanese Laid-open Patent Publication No. 2010-93414, compression code stored in the structure of a leaf using the $2^m$-branch nodeless Huffman tree 7c, and writes the extracted compression code in the compression buffer, thereby performing data compression.

Upon description being made with reference to a specific example, the compressing unit 8b first obtains the files of multiple electronic books from the storage unit 7. The compressing unit 8b then calculates the number of times of appearance of characters from the files of the multiple electronic books, and calculates the compression parameters 7b. Next, the compressing unit 8b generates a $2^n$-branch Huffman tree from the compress parameters 7b, and converts the generated $2^n$-branch Huffman tree into the nodeless Huffman tree 7c, thereby generating the nodeless Huffman tree 7c. The compressing unit 8b then generates the above-mentioned appearance map 7d. Next, the compressing unit 8b compresses each block divided from an electronic book files using the nodeless Huffman tree 7c.

The first encryption unit 8c encrypts the first block of an electronic book file. For example, the first encryption unit 8c encrypts the first block with a predetermined key and block length using an encryption algorithm of DES, triple DES, AES, or RSA which is high in encryption intensity as compared to EXOR, bit transposition, digit transposition, and byte transposition. An encryption algorithm that is high in intensity is employed for encryption of the first block, and accordingly, it is difficult for an attacker or the like to interpret the encrypted first block, and accordingly, it is difficult to guess encryption parameters to be used for the second block and thereafter. Therefore, in comparison with a case where an encryption algorithm such as EXOR, bit transposition, digit transposition, byte transposition or the like is employed for encryption of the first block, intensity in encryption of all blocks is high, and interpretation of an encrypted file is further complicated.

Hereafter, description will be made with reference to a case where the first encryption unit 8c encrypts the first block compressed by the compressing unit 8b with a predetermined key K1 and 1024-bit block length using the RSA encryption algorithm.

The second encryption unit 8d encrypts the j-th block of the second block and thereafter of an electronic book file using encryption parameters to be used for encryption of the j-th block that the information generated by the generating unit 8a indicates.

With the example in FIG. 6, the second encryption unit 8d encrypts the second block compressed by the compressing unit 8b with the encryption algorithm "γ", key "C", and block length "$n_Y$". Also, with the example in FIG. 6, the second encryption unit 8d encrypts the third block compressed by the compressing unit 8b with the encryption algorithm "δ", key "D", and block length "$n_L$".

Also, the second encryption unit 8d integrates the encryption table 7a, compression parameters 7b, and appearance map 7d into one file. The second encryption unit 8d then encrypts the file using RSA, and stores the encrypted filed in the storage unit 7. Also, upon receiving instructions for transmitting the encryption table 7a, compression parameters 7b, and appearance map 7d from the user terminal 3, the second encryption unit 8d transmits the file stored in the storage unit 7 to the user terminal 3 via the transmission/reception unit 6 and Internet 80. Also, upon receiving instructions for transmitting an electronic book from the user terminal 3, the second encryption unit 8d transmits an electronic book stored in the storage unit 7 which has been compressed and encrypted, to the user terminal 3 via the transmission/reception unit 6 and Internet 80.

The control unit 8 includes an integrated circuit such as an ASIC (Application Specific Integrated Circuit) or FPGA (Field Programmable Gate Array) or the like. Note that the control unit 8 may include an electronic circuit such as a CPU (Central Processing Unit) or MPU (Micro Processing Unit) or the like.

Now, description will return to FIG. 1. The user terminal 3 includes an input unit 9, an output unit 10, a transmission/reception unit 11, a storage unit 12, and a control unit 13.

The input unit 9 inputs various types of information to the control unit 13. For example, the input unit 9 accepts a search keyword and instructions for executing later-described search processing from the user, and inputs the accepted search keyword and instructions to the control unit 13. Device examples of the input unit 9 include operation accepting devices such as a mouse, a keyboard, and so forth.

The output unit 10 outputs various types of information. For example, the output unit 10 displays items searched with a keyword using the display control unit 13c. Device examples of the output unit 10 include display devices such as an LCD (Liquid Crystal Display), a CRT (Cathode Ray Tube), and so forth.

The transmission/reception unit 11 is a communication interface for performing communication between the user terminal 3 and the server 2. For example, upon receiving instructions for transmitting the encryption table 7a, compression parameters 7b, and appearance map 7d from the control unit 13, the transmission/reception unit 11 transmits the received instructions to the server 2 via the Internet 80. Also, upon receiving a file of the encryption table 7a, compression parameters 7b, and appearance map 7d encrypted by RSA, the transmission/reception unit 11 transmits the file of the received encryption table 7a, compression parameters 7b, and appearance map 7d to the control unit 13. Also, upon receiving instructions from the server 2 for transmitting an electronic book from the control unit 13, the transmission/reception unit 11 transmits the received instructions to the server 2 via the Internet 80. Also, upon receiving a compressed and encrypted electronic book which is an electronic book transmitted from the server 2, the transmission/reception unit 11 transmits the received electronic book to the control unit 13.

The storage unit 12 stores various types of information. For example, the encryption table 7a, compression parameters 7b, and appearance map 7d decrypted by a later-described decryption unit 13a are stored in the storage unit 12. Also, the nodeless Huffman tree 7c generated by a later-described decompressing unit 13b is stored in the storage unit 12.

The storage unit 12 is a semiconductor memory device such as flash memory, or a storage device such as a hard disk or optical disc, for example. Note that the storage unit 12 is not restricted to the above kinds of storage devices, and may be RAM (Random Access Memory) or ROM (Read Only Memory).

The control unit 13 includes internal memory for storing a program or control data which stipulates various types of processing procedures, and executes various types of processing using these. As illustrated in FIG. 1, the control unit 13 includes a decryption unit 13a, a decompressing unit 13b, and a display control unit 13c.

The decryption unit 13a decrypts the blocks of an electronic book file. An example of processing that the decryption unit 13a executes will be described. Upon receiving instructions for executing search processing via the input unit 9, the decryption unit 13a transmits instructions for transmitting an electronic book, and instructions for transmitting the encryption table 7a, compression parameters 7b, and appearance map 7d to the server 2 via the transmission/reception unit 11 and Internet 80. Upon receiving a file of the encrypted encryption table 7a, compression parameters 7b, and appearance map 7d from the server 2, the decryption unit 13a decrypts the received file using RSA.

Also, the decryption unit 13a decrypts, with regard to an electronic book specified by a later-described decompressing unit 13b of the electronic books transmitted from the server 2, the first block of the file with a predetermined key K1 and 1024-bit block length using the RSA algorithm.

Also, the decryption unit 13a obtains one character out of the character string of the j-th block decompressed by a later-described decompressing unit 13b. The decryption unit 13a then obtains the number of a leaf of the nodeless Huffman tree 7c in which the obtained character is stored. Next, the decryption unit 13a obtains the encryption parameters corresponding to the leaf number from the encryption table 7a stored in the storage unit 12 as decryption parameters to be used for decryption of the next (j+1)-th block. The decryption unit 13a then decrypts the (j+1)-th block of the electronic book file using the decryption parameters corresponding to the obtained (j+1)-th block.

Figure 7:
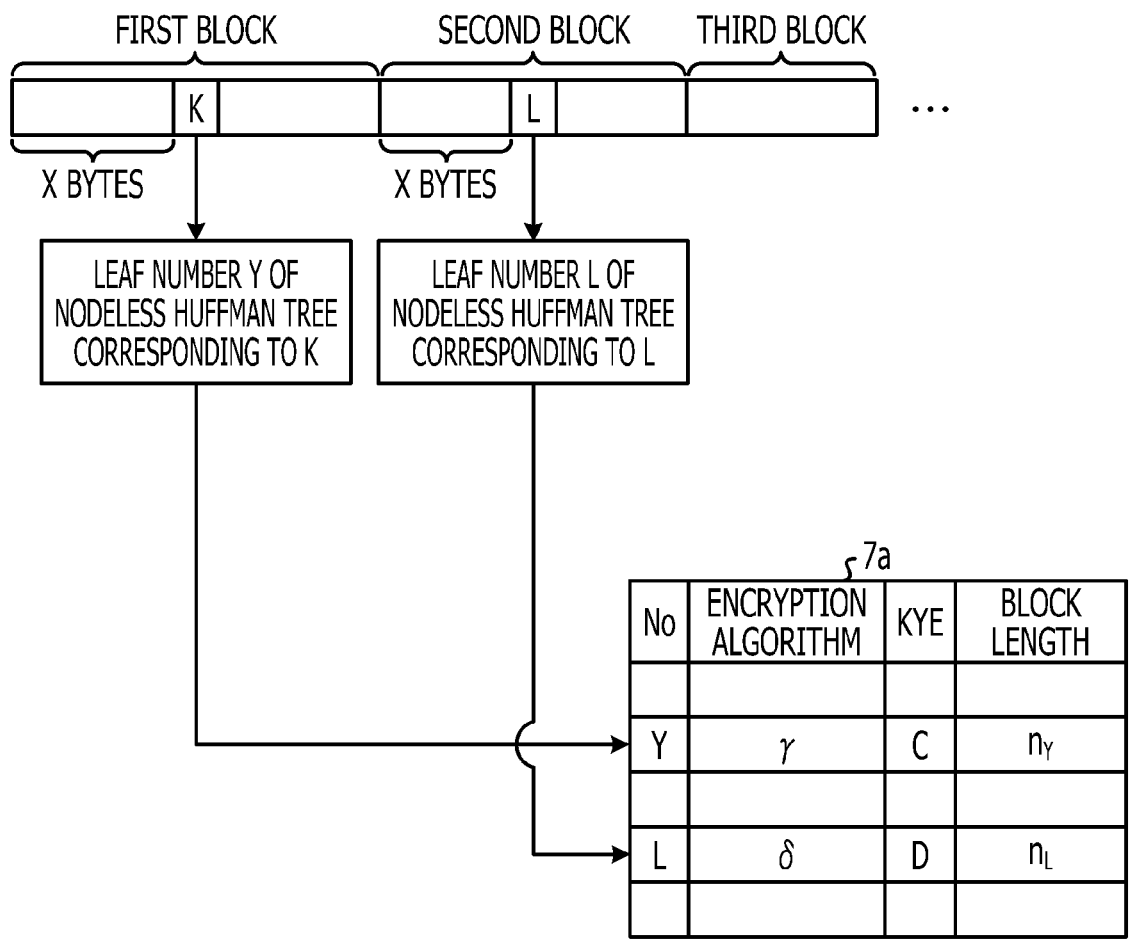
FIG. 7 illustrates an example of user-terminal processing.

FIG. 7 is a diagram for describing an example of user terminal processing. With the example in FIG. 7, the decryption unit 13a obtains a predetermined X-th byte character "K" from the beginning of the first block of the decrypted electronic book file. With the example in FIG. 7, the decryption unit 13a then obtains the number "Y" of a leaf of the nodeless Huffman tree 7c in which the character "K" is stored. Next, with the example in FIG. 7, the decryption unit 13a obtains the algorithm "γ", key "C", and block length "$n_Y$" corresponding to the obtained leaf number "Y" as decryption parameters to be used for decryption of the next second block. With the example in FIG. 7, the decryption unit 13a decrypts the second block of the encrypted electronic book file using the obtained algorithm "γ", key "C", and block length "$n_γ$".

Also, with the example in FIG. 7, the decryption unit 13a obtains a predetermined X-th byte character "L" from the beginning of the second block of the decrypted electronic book file. With the example in FIG. 7, the decryption unit 13a then obtains the number "L" of a leaf of the nodeless Huffman tree 7c in which the character "L" is stored. Next, with the example in FIG. 7, the decryption unit 13a obtains the algorithm "δ", key "D", and block length "$n_L$" corresponding to the obtained leaf number "L" as decryption parameters to be used for decryption of the next third block. With the example in FIG. 7, the decryption unit 13a decrypts the third block of the encrypted electronic book file using the obtained algorithm "δ", key "D", and block length "$n_L$".

In this way, with the encryption table 7a to be used for decryption, there is registered information that correlates the number of a leaf where a character positioned in a predetermined location of the j-th block is stored, with decryption parameters to be used for decryption of the (j+1)-th block following the j-th block. Here, it is difficult to recognize the number of a leaf corresponding to each block from each file of electronic books. Therefore, it is difficult to recognize what kind of decryption parameters are used for decrypting each block of the electronic books from the registration contents of the encryption table 7a. Accordingly, even in the event that the contents of the encryption table 7a stored in the storage unit 12 have externally been leaked, it is difficult for an attacker or the like to recognize a rule regarding what kind of decryption parameters are used for decrypting each block of the electronic books. Therefore, interpretation of data can further be complicated.

The decompressing unit 13b decompresses each block divided from an electronic book file using the nodeless Huffman tree 7c. For example, the decompressing unit 13b generates, as described in Japanese Laid-open Patent Publication No. 2010-93414, a $2^n$-branch Huffman tree from the compression parameters 7b, converts the generated $2^n$-branch Huffman tree into the nodeless Huffman tree 7c, thereby generating the nodeless Huffman tree 7c. The decompressing unit 13b then stores the generated nodeless Huffman tree 7c in the storage unit 12.

Also, the decompressing unit 13b determines files including all of the search keywords of the decrypted electronic book files using the appearance map 7d stored in the storage unit 12. That is to say, the files including all of the search keywords become files to be decrypted at the decryption unit 13a, and files to be decompressed at the decompressing unit 13b. In this way, the files to be processed are narrowed down, thereby realizing speed-up in processing.

The decompressing unit 13b then sets a compression code string in a register, and extracts compression code using a mask pattern. Next, the decompressing unit 13b searches the extracted compression code from the root of the $2^m$-branch nodeless Huffman tree 7c by access for one branch worth, i.e., by one path. Next, the decompressing unit 13b reads out character code stored in the structure of the accessed leaf, and stores in the decompression buffer of the storage unit 12.

The display control unit 13c controls the display of the output unit 10 so as to display the search results as to an electronic book. For example, the display control unit 13c displays, as described in International Publication Pamphlet No. WO 2006/123448, items including a keyword on the output unit 10 out of a decompressed file.

The control unit 13 includes an integrated circuit such as an ASIC (Application Specific Integrated Circuit) or FPGA (Field Programmable Gate Array) or the like. Note that the control unit 13 may include an electronic circuit such as a CPU (Central Processing Unit) or MPU (Micro Processing Unit) or the like.

Figure 8:
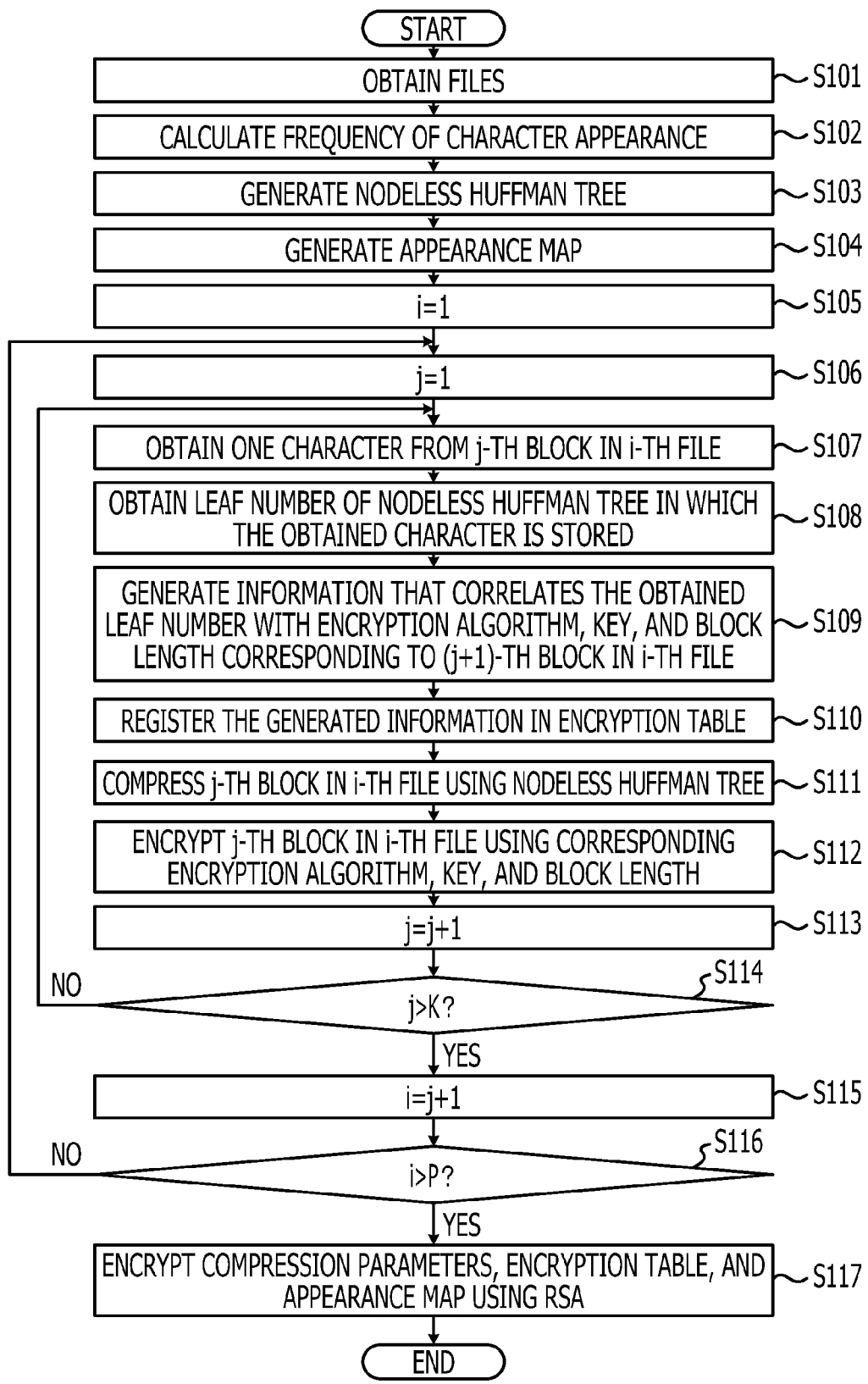
FIG. 8 is a flowchart illustrating a procedure example of compression and encryption processing according to the first embodiment.

Next, the flow of processing of the server 2 according to the present embodiment will be described. FIG. 8 is a flowchart illustrating a procedure of compression and encryption processing according to the first embodiment. This compression and encryption processing is executed in the event that instructions for executing the compression and encryption processing have been input from the input unit 4 to the control unit 8.

As illustrated in FIG. 8, the compressing unit 8b obtains multiple electronic book files from the storage unit 7 (S101). The compressing unit 8b calculates the number of times of appearance of a character and calculates the compression parameters 7b from the multiple electronic book files (S102). The compressing unit 8b generates a $2^n$-branch Huffman tree from the compression parameters 7b, and converts the generated $2^n$-branch Huffman tree into a nodeless Huffman tree, thereby generating a nodeless Huffman tree (S103). The compressing unit 8b generates the appearance map 7d (S104).

The compressing unit 8b sets 1 as the value of a variable i (S105). The compressing unit 8b sets 1 as the value of a variable j (S106).

The generating unit 8a obtains one character out of the character string of the j-th block in the i-th file of the electronic book (S107). The generating unit 8a obtains the number of a leaf of the nodeless Huffman tree 7c in which the obtained character is stored (S108). The generating unit 8a generates information that correlates the obtained leaf number with the encryption parameters such as an encryption algorithm, a key, and block length which are used for encryption of the (j+1)-th block in the i-th file (S109). The generating unit 8a registers the generated information in the encryption table 7a (S110).

The compressing unit 8b compresses the j-th block in the i-th file using the nodeless Huffman tree 7c (S111). The first encryption unit 8c and second encryption unit 8d encrypt the j-th block in the i-th file (S112). Here, in the event that the value of the variable j is 1, the first encryption unit 8c encrypts the first block of the electronic book file. Also, in the event that the value of the variable j is equal to or greater than 2, the second encryption unit 8d encrypts the j-th block using the encryption parameters that are indicated with the information generated by the generating unit 8a and used for encryption of the j-th block.

The compressing unit 8b increments the value of the variable j by one (S113). The compressing unit 8b determines whether or not the value of the variable j exceeds the number K of blocks divided from the i-th file (S114). In the event that the value of the variable j does not exceed the number K (No in S114), the flow returns to S107.

On the other hand, in the event that the value of the variable j exceeds the number K (Yes in S114), the compressing unit 8b increments the value of the variable i by one (S115). The compressing unit 8b determines whether or not the value of the variable i exceeds the number P of electronic book files (S116). In the event that the value of the variable i does not exceed the number P (No in S116), the flow returns to S106. On the other hand, in the event that the value of the variable i exceeds the number P (Yes in S116), the second encryption unit 8d performs the following processing. Specifically, the second encryption unit 8d integrates the encryption table 7a, compression parameters 7b and appearance map 7d into one file, encrypts this using RSA, and stores the encrypted file in the storage unit 7 (S117), and ends the processing.

Figure 9:
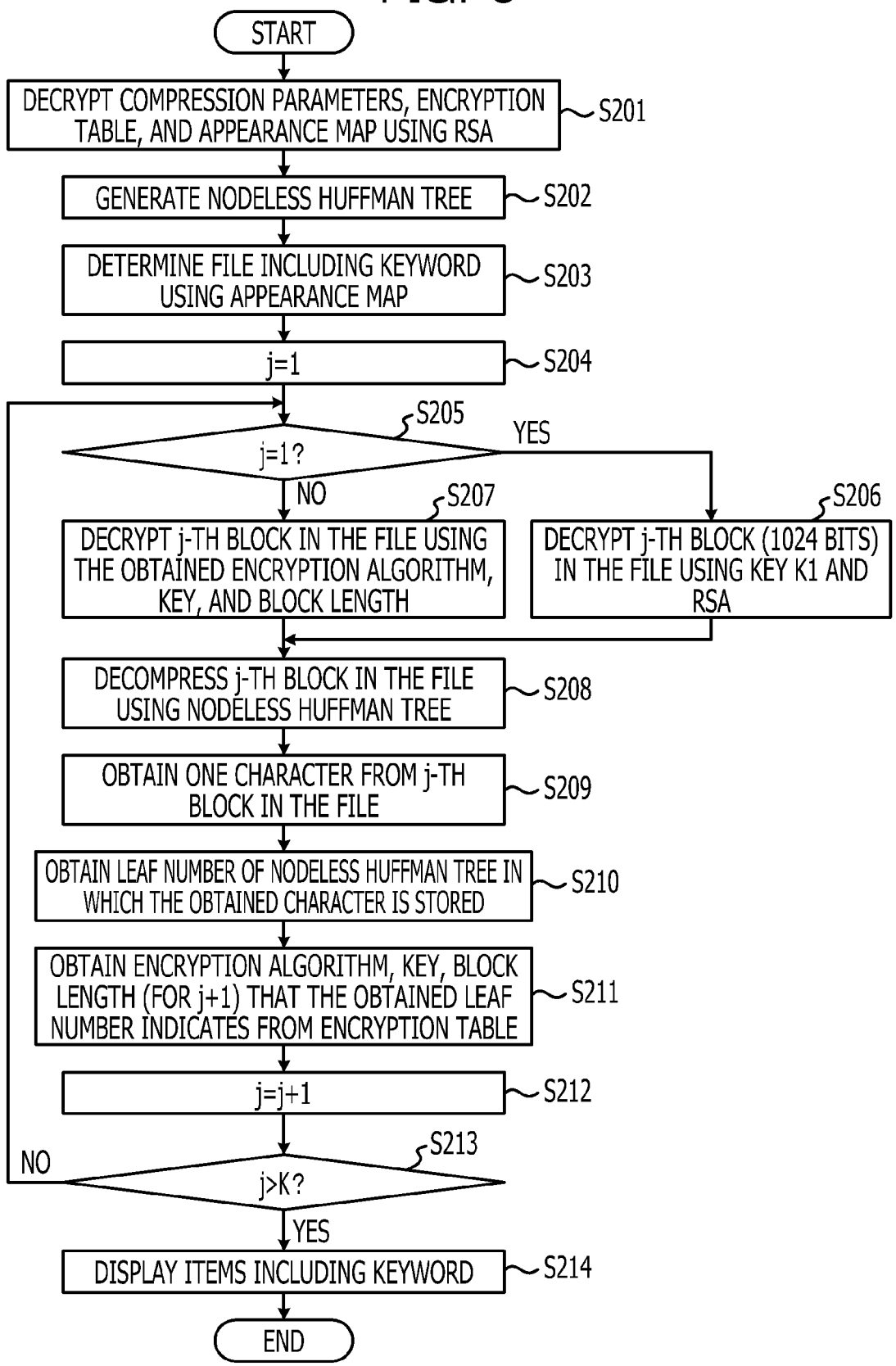
FIG. 9 is a flowchart illustrating a procedure example of search processing according to the first embodiment.

Next, the flow of the processing of the user terminal 3 according to the present embodiment will be described. FIG. 9 is a flowchart illustrating a procedure of search processing according to the first embodiment. This search processing is executed in the event that a search keyword and instructions for executing the search processing have been input from the input unit 9 to the control unit 13.

As illustrated in FIG. 9, the decryption unit 13a decrypts the file of the encrypted encryption table 7a, compression parameters 7b, and appearance map 7d received from the server 2 using RSA (S201). The decompressing unit 13b generates a $2^n$-branch Huffman tree from the compression parameters 7b, converts the generated $2^n$-branch Huffman tree into the nodeless Huffman tree 7c, thereby generating the nodeless Huffman tree 7c (S202). The decompressing unit 13b determines a file including all of search keywords of decrypted electronic book files using the appearance map 7d stored in the storage unit 12 (S203). The decompressing unit 13b sets 1 as the value of the variable j (S204).

The decryption unit 13a determines whether or not the value of the variable j is 1 (S205). In the event that the value of the variable j is 1 (Yes in S205), the decryption unit 13a decrypts the first block of the electronic book file determined in S203 with a predetermined key K1 and 1024-bit block length using the RSA algorithm (S206). On the other hand, in the event that the value of the variable j is not 1 (No in S205), the decryption unit 13a performs the following processing. Specifically, the decryption unit 13a decrypts the j-th block of the electronic book file determined in S203 using the decryption parameters corresponding to the j-th block which are the decryption parameters obtained in a later-described S211 (S207). The decompressing unit 13b then decompresses the j-th block in the file using the nodeless Huffman tree 7c (S208). The decryption unit 13a obtains one character out of the character string of the decompressed j-th block (S209).

The decryption unit 13a obtains a leaf number of the nodeless Huffman tree 7c in which the obtained character is stored (S210). The decryption unit 13a obtains the decryption parameters corresponding to the leaf number from the encryption table 7a stored in the storage unit 12 as the decryption parameters to be used for decryption of the next (j+1)-th block (S211). The decryption unit 13a increments the value of the variable j by one (S212). The decryption unit 13a determines whether or not the value of the variable j exceeds the above-mentioned number K (S213).

In the event that the value of the variable j does not exceed the number K (No in S213), the flow returns to S205. On the other hand, in the event that the value of the variable j exceeds the number K (Yes in S213), the display control unit 13c displays items including a keyword on the output unit 10 out of the decompressed file (S214), and the processing is ended.

As described above, the server 2 according to the present embodiment generates information that correlates predetermined character data of the j-th block included in the file to be encrypted, with the encryption algorithm, key, and block length. The server 2 according to the present embodiment encrypts the j-th block using a predetermined key or the key correlated with the predetermined character data of the (j−1)-th block. Next, the server 2 according to the present embodiment encrypts the (j+1)-th block with the block length correlated with the predetermined character data of the j-th block using the key correlated with the predetermined character data of the j-th block. In this way, the server 2 according to the present embodiment generates information that correlates a character positioned in a predetermined location of the j-th block with the encryption parameters to be used for encryption of the (j+1)-th block. Here, it is difficult to recognize a character positioned in a predetermined location of each block from an electronic book file or the generated information. Therefore, it is difficult to recognize what kind of encryption parameters each block in a file is encrypted with, from the generated information. Accordingly, even in the event that the generated information has externally been leaked, it is difficult for an attacker or the like to recognize a rule regarding what kind of encryption parameters are used for encrypting each block in a file. Therefore, it is also difficult for an attacker or the like to decrypt an encrypted file. Therefore, according to the server 2 according to the present embodiment, interpretation of data can further be complicated.

Also, the server 2 according to the present embodiment compresses each block using the nodeless Huffman tree 7c for converting character data into compressed code data. The server 2 according to the present embodiment then generates information that correlates character data stored in a leaf of the nodeless Huffman tree 7c with the encryption parameters of the next block. Therefore, according to the server 2 according to the present embodiment, it can be realized to perform compression and encryption in increments of blocks, and accordingly, compression and encryption can be performed using a compression buffer with smaller storage capacity or the like.

Also, the user terminal 3 according to the present embodiment decrypts the j-th block included in a file to be decrypted using a predetermined key or a key correlated with predetermined character data of the (j−1)-th block. Also, the user terminal 3 according to the present embodiment decrypts the (j+1)-th block included in the file to be decrypted using a key correlated with predetermined character data of the j-th block. The user terminal 3 according to the present embodiment employs information that correlates the number of a leaf where a character positioned in a predetermined location of the j-th block to be used for decryption is stored, with decryption parameters to be used for decryption of the (j+1)-th block following the j-th block, for block decryption. Here, it is difficult to recognize the number of a leaf corresponding to each block from an electronic book file or information to be used for decryption. Therefore, it is difficult to recognize regarding what kind of decryption parameters are used for decrypting each block in an electronic book from information to be used for decryption. Accordingly, even in the event that the contents of the encryption table 7a stored in the storage unit 12 has externally been leaked, it is difficult for an attacker or the like to recognize a rule regarding what kind of encryption parameters are used for encrypting each block of an electronic book. Therefore, interpretation of data can further be complicated. Also, processing cost for encryption processing or decryption processing can be suppressed while encryption data has interpretation difficulty.

Next, a second embodiment will be described.

With the above-mentioned first embodiment, though a case employing a nodeless Huffman tree has been exemplified, the disclosed device is not restricted to this. Therefore, with the second embodiment, a case employing an LZ77 compression method will be described.

Figure 10:
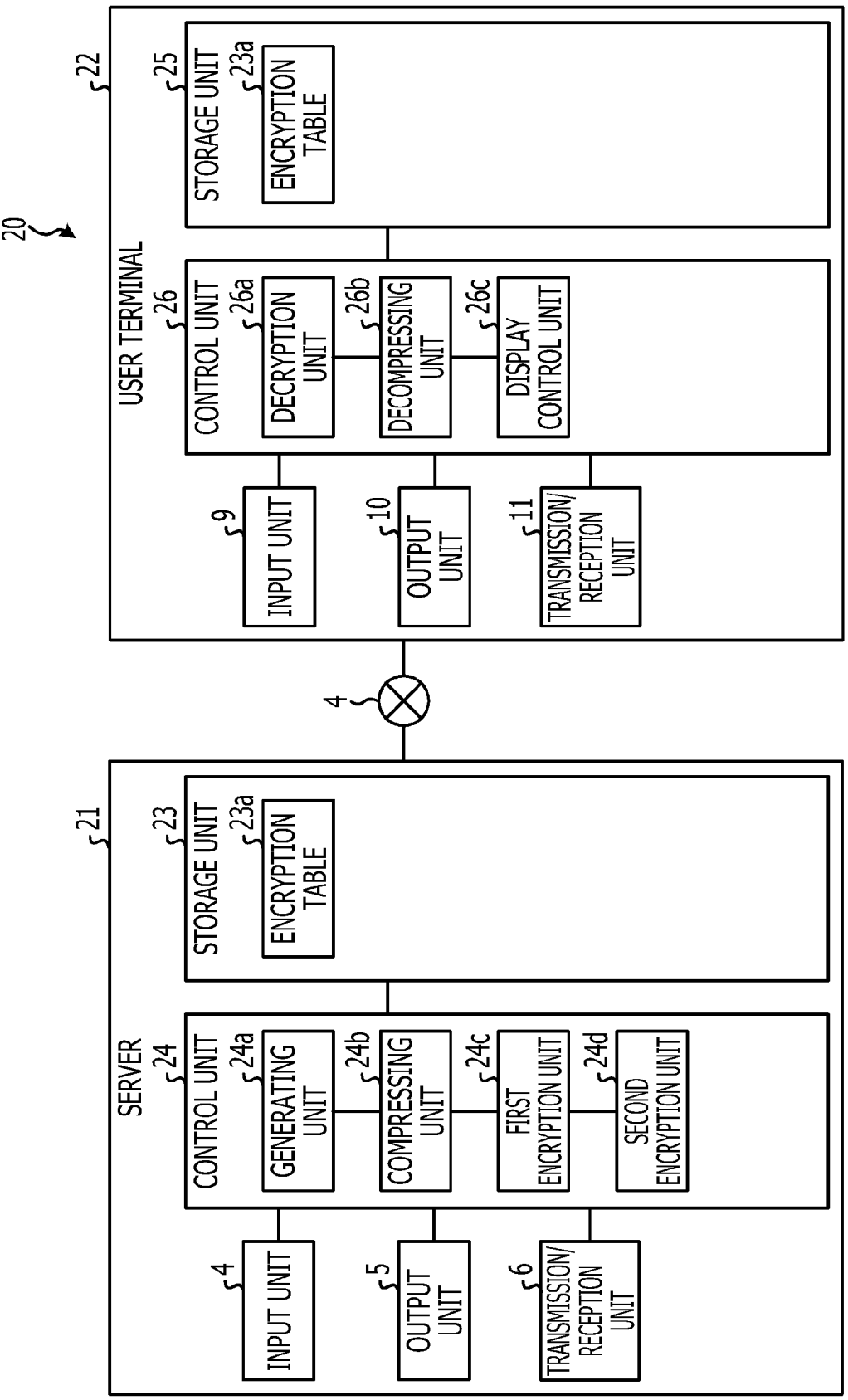
FIG. 10 illustrates an example of the configuration of a system according to a second embodiment.

FIG. 10 is a diagram illustrating an example of the configuration of a system according to the second embodiment. As illustrated in FIG. 10, a system 20 includes a server 21 instead of the server 2 according to the first embodiment, and a user terminal 22 instead of the user terminal 3. Note that, hereafter, the units and the devices which accomplish the same functions as with the first embodiment are denoted with the same reference numerals as with FIG. 1, and description thereof may be omitted.

The server 21 includes an input unit 4, an output unit 5, a transmission/reception unit 6, a storage unit 23, and a control unit 24.

The transmission/reception unit 6 is a communication interface for performing communication between the server 21 and the user terminal 22. For example, upon receiving a later-described encryption table 23a from the control unit 24, the transmission/reception unit 6 transmits the received encryption table 23a to the user terminal 22 via the Internet 80. Also, upon receiving compressed and encrypted electronic book from the control unit 24, the transmission/reception unit 6 transmits the received electronic book to the user terminal 22 via the Internet 80.

The storage unit 23 stores various types of information. For example, the storage unit 23 stores the encryption table 23a.

In the event of encrypting the blocks, in the same way as with the encryption table 7a according to the first embodiment, algorithm information indicating an encryption algorithm to be used for encryption, key information indicating a key, and block length information indicating block length are registered in the encryption table 23a. Also, with the encryption table 23a, the beginning address from a reference portion of the slide dictionary of the obtained character is registered in a manner correlated with algorithm information, key information, and block length. Thus, the algorithm information, key information, and block length are correlated with the character correlated with the beginning address.

Now, a combination of encrypted algorithm, key, and block length to be registered in the encryption table 23a is the same as a combination of encrypted algorithm, key, and block length to be registered in the encryption table 7a according to the first embodiment, and accordingly, description thereof will be omitted.

FIG. 11 is a diagram illustrating an example of an encryption table. The example in FIG. 11 illustrates a case where an encryption algorithm "α", a key "a", and block length "$n_E$" are correlated with the beginning address "E". Also, the example in FIG. 11 illustrates a case where an encryption algorithm "β", a key "b", and block length "$n_F$" are correlated with the beginning address "F".

The storage unit 23 is a semiconductor memory device such as flash memory, or a storage device such as a hard disk or optical disc, for example. Note that the storage unit 23 is not restricted to the above kinds of storage devices, and may be RAM (Random Access Memory) or ROM (Read Only Memory).

The control unit 24 includes internal memory for storing a program or control data which stipulates various types of processing procedures, and executes various types of processing using these. As illustrated in FIG. 10, the control unit 24 includes a generating unit 24a, a compressing unit 24b, a first encryption unit 24c, and a second encryption unit 24d.

In the event that the beginning character of the block to be processed is set in the beginning portion of an encryption portion of the slide window, the generating unit 24a obtains one character out of a character string of the encryption portion. In the event that the slide window has been slid for one block worth by a later-described compressing unit 24b, the generating unit 24a obtains the address from the head of a reference portion where the obtained character is positioned. Next, the generating unit 24a generates information that correlates the obtained address with encryption parameters such as the encryption algorithm, key, and block length to be used for encryption of the next block, and registers the generated information in the encryption table 23a. The generating unit 24a performs such processing on each block in each file of multiple electronic books. The generating unit 24a can employ the above-mentioned EXOR, bit transposition, digit transposition, byte transposition, DES, triple DES, AES, and RSA as an encryption algorithm to be used for encryption of the next block. Note that an encryption algorithm to be used for encryption is not restricted to these. Also, the block length of each block, and an encryption algorithm and a key which are used for encryption of each block are defined beforehand, and the generating unit 24a generates information that correlates a leaf number with encryption parameters for each block in accordance with the defined information thereof. The user can define the block length of each block, and an encryption algorithm and a key which are used for encryption of each block via the input unit 4.

Figure 12:
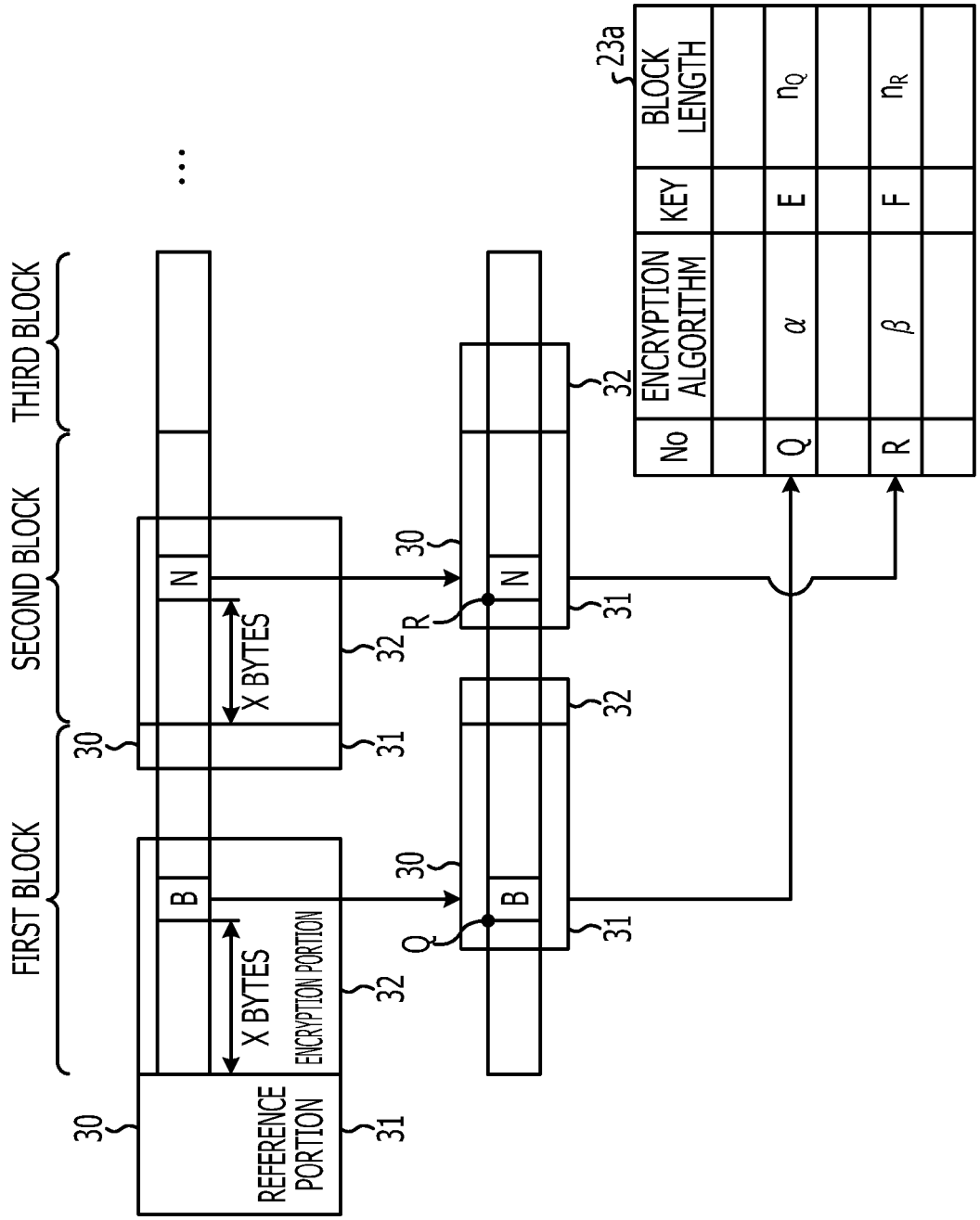
FIG. 12 illustrates an example of server processing.

FIG. 12 is a diagram for describing an example of server processing. With the example in FIG. 12, in the event that the beginning character of the first block of an electronic book file has been set in the beginning of an encryption portion 32 of a slide window 30, the generating unit 24a obtains a predetermined X-th byte character "B" from the beginning of the encryption portion 32. With the example in FIG. 12, in the event that the first block has been compressed by a later-described compressing unit 24b, and the slide window has slid for one block worth, the generating unit 24a obtains an address "Q" from the beginning of a reference portion 31 where the obtained character "B" is positioned. Next, with the example in FIG. 12, the generating unit 24a generates information that correlates the obtained address "Q" with an encryption algorithm "α", key "E", and block length "$n_Q$" to be used for encryption of the second block which is the next block. With the example in FIG. 12, the generating unit 24a registers the information that correlates the obtained address "Q" with an encryption algorithm "α", key "E", and block length "$n_Q$", in the encryption table 23a.

Also, with the example in FIG. 12, in the event that the beginning character of the second block of an electronic book file has been set in the beginning of the encryption portion 32 of the slide window 30, the generating unit 24a obtains a predetermined X-th byte character "N" from the beginning of the encryption portion 32. With the example in FIG. 12, in the event that the second block has been compressed by a later-described compressing unit 24b, and the slide window has slid for one block worth, the generating unit 24a obtains an address "R" from the beginning of the reference portion 31 where the obtained character "N" is positioned. Next, with the example in FIG. 12, the generating unit 24a generates information that correlates the obtained address "R" with an encryption algorithm "β", key "F", and block length "$n_R$" to be used for encryption of the third block which is the next block. With the example in FIG. 12, the generating unit 24a registers the information that correlates the obtained address "R" with the encryption algorithm "β", key "F", and block length "$n_R$", in the encryption table 23a.

In this way, the generating unit 24a obtains a character positioned in a predetermined location of the j-th block. The generating unit 24a generates information that correlates an address indicating the position of a character in the event that the j-th block has been compressed, and the slide window has been slid for one block worth, with encryption parameters to be used fro encryption of the (j+1)-th block following the j-th block. The generating unit 24a then registers the generated information in the encryption table 23a. Here, it is difficult to recognize an address corresponding to each block from multiple electronic book files and the generated information. Therefore, it is difficult to recognize what kind of encryption parameters are used for encrypting each block of the electronic books from the registration contents of the encryption table 23a. Accordingly, even in the event that the contents of the encryption table 23a has externally been leaked, it is difficult for an attacker or the like to recognize a rule regarding what kind of encryption parameters are used for encrypting each block of the electronic books. Therefore, it is also difficult for an attacker or the like to decrypt an encrypted electronic book. Therefore, according to the generating unit 24a, interpretation of data can further be complicated.

The compressing unit 24b compresses each block of an electronic book file using the LZ77 compression method employing the slide window 30 having the reference portion 31 and encryption portion 32.

The first encryption unit 24c encrypts the first block of an electronic book file. For example, the first encryption unit 24c encrypts the first block with a predetermined key and block length using an encryption algorithm of DES, triple DES, AES, or RSA which is high in encryption intensity as compared to EXOR, bit transposition, digit transposition, and byte transposition.

Hereafter, description will be made with reference to a case where the first encryption unit 24c encrypts the first block compressed by the compressing unit 24b with a predetermined key K1 and 1024-bit block length using the RSA encryption algorithm.

The second encryption unit 24d encrypts the j-th block of the second block and thereafter of an electronic book file using encryption parameters to be used for encryption of the j-th block that the information generated by the generating unit 24a indicates.

With the example in FIG. 12, the second encryption unit 24d encrypts the second block compressed by the compressing unit 24b with the encryption algorithm "α", key "E", and block length "$n_Q$". Also, with the example in FIG. 12, the second encryption unit 24d encrypts the third block compressed by the compressing unit 24b with the encryption algorithm "β", key "F", and block length "$n_R$".

Also, the second encryption unit 24d encrypts the encryption table 23a using RSA, and stores the encrypted encryption table 23a in the storage unit 23. Also, upon receiving instructions for transmitting the encryption table 23a from the user terminal 22, the second encryption unit 24d transmits the encryption table 23a stored in the storage unit 23 to the user terminal 22 via the transmission/reception unit 6 and Internet 80. Also, upon receiving instructions for transmitting an electronic book from the user terminal 22, the second encryption unit 24d transmits an electronic book stored in the storage unit 23 to the user terminal 22 via the transmission/reception unit 6 and Internet 80.

The control unit 24 includes an integrated circuit such as an ASIC (Application Specific Integrated Circuit) or FPGA (Field Programmable Gate Array) or the like. Note that the control unit 24 may include an electronic circuit such as a CPU (Central Processing Unit) or MPU (Micro Processing Unit) or the like.

Now, description will return to FIG. 10. The user terminal 22 includes an input unit 9, an output unit 10, a transmission/reception unit 11, a storage unit 25, and a control unit 26.

The output unit 10 outputs various types of information. For example, the output unit 10 displays items searched with a keyword using a display control unit 26c. Device examples of the output unit 10 include display devices such as an LCD (Liquid Crystal Display), a CRT (Cathode Ray Tube), and so forth.

The transmission/reception unit 11 is a communication interface for performing communication between the user terminal 22 and the server 21. For example, upon receiving instructions for transmitting the encryption table 23a from the control unit 26, the transmission/reception unit 11 transmits the received instructions to the server 21 via the Internet 80. Also, upon receiving the encryption table 23a encrypted by RSA from the server 21, the transmission/reception unit 11 transmits the received encryption table 23a to the control unit 26. Also, upon receiving instructions for transmitting an electronic book from the control unit 26, the transmission/reception unit 11 transmits the received instructions to the server 21 via the Internet 80. Also, upon receiving an electronic book transmitted from the server 21, the transmission/reception unit 11 transmits the received electronic book to the control unit 26.

The storage unit 25 stores various types of information. For example, the encryption table 23a decrypted by a later-described decryption unit 26a is stored in the storage unit 25.

The storage unit 25 is a semiconductor memory device such as flash memory, or a storage device such as a hard disk or optical disc, for example. Note that the storage unit 25 is not restricted to the above kinds of storage devices, and may be RAM (Random Access Memory) or ROM (Read Only Memory).

The control unit 26 includes internal memory for storing a program or control data which stipulates various types of processing procedures, and executes various types of processing using these. As illustrated in FIG. 10, the control unit 26 includes a decryption unit 26a, a decompressing unit 26b, and a display control unit 26c.

The decryption unit 26a decrypts the blocks of an electronic book file. An example of processing that the decryption unit 26a executes will be described. Upon receiving instructions for executing search processing via the input unit 9, the decryption unit 26a transmits instructions for transmitting an electronic book, and instructions for transmitting the encryption table 23a to the server 21 via the transmission/reception unit 11 and Internet 80. Upon receiving the encrypted encryption table 23a from the server 21, the decryption unit 26a decrypts the received encryption table 23a using RSA.

Also, the decryption unit 26a decrypts, with regard to an electronic book transmitted from the server 21, the first block of the file with a predetermined key K1 and 1024-bit block length using the RSA algorithm.

Also, the decryption unit 26a obtains a predetermined X-th byte character from the beginning of the encryption portion 32 in the event that the beginning character of the j-th block decompressed by a later-described decompressing unit 26b has been set in the beginning of the encryption portion 32 of the slide window 30. The decryption unit 26a obtains an address from the beginning of the reference portion 31 of the slide window 30 slid for decompressing the j-th block by a later-described decompressing unit 26b, and indicating the position of the obtained character. Next, the decryption unit 26a obtains decompression parameters corresponding to the address from the encryption table 23a stored in the storage unit 25 as decryption parameters to be used for decryption of the next (j+1)-th block. The decryption unit 26a decrypts the (j+1)-th block of the electronic book file using the decryption parameters corresponding to the obtained (j+1)-th block.

Figure 13:
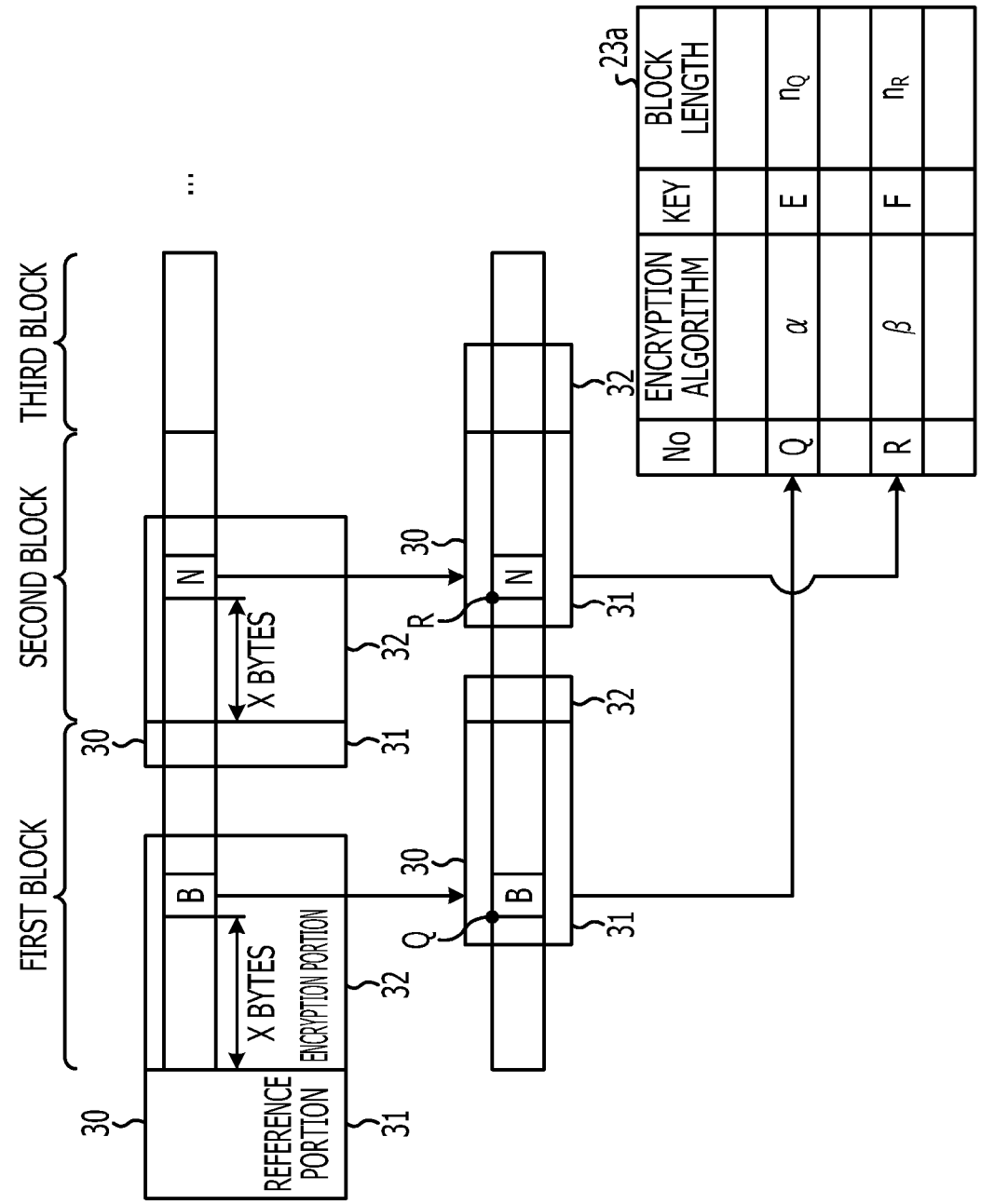
FIG. 13 illustrates an example of user-terminal processing.

FIG. 13 is a diagram for describing an example of user terminal processing. With the example in FIG. 13, the decryption unit 26a obtains a predetermined X-th byte character "B" from the beginning of the encryption portion 32 in the event that the beginning character of the first block of the decompressed file has been set in the beginning of the encryption portion 32. With the example in FIG. 13, the decryption unit 26a then obtains the address "Q" of the character "B" of the beginning of the reference portion 31 in the event that the first block has been decompressed. Next, with the example in FIG. 13, the decryption unit 26a obtains the algorithm "α", key "E", and block length "$n_Q$" corresponding to the obtained address "Q" from the encryption table 23a as decryption parameters to be used for decryption of the next second block. With the example in FIG. 13, the decryption unit 26a decrypts the second block of the encrypted electronic book file using the obtained algorithm "α", key "E", and block length "$n_Q$".

Also, with the example in FIG. 13, the decryption unit 26a obtains a predetermined X-th byte character "N" from the beginning of the encryption portion 32 in the event that the beginning character of the second block of the decompressed file has been set in the beginning of the encryption portion 32. With the example in FIG. 13, the decryption unit 26a then obtains the address "R" of the character "N" from beginning of the reference portion 31 in the event that the second block has been decompressed. Next, with the example in FIG. 13, the decryption unit 26a obtains the algorithm "β", key "F", and block length "$n_R$" corresponding to the obtained address "R" from the encryption table 23a as decryption parameters to be used for decryption of the next second block. With the example in FIG. 13, the decryption unit 26a decrypts the second block of the encrypted electronic book file using the obtained algorithm "β", key "F", and block length "$n_R$".

In this way, with the encryption table 23a to be used for decryption, there is registered information that correlates an address indicating the position of a character positioned in a predetermined location of the j-th block with encryption parameters to be used for encryption of the (j+1)-th block following the j-th block. Here, it is difficult to recognize an address corresponding to each block from electronic book files and the registered information. Therefore, it is difficult to recognize what kind of decryption parameters are used for decrypting each block of the electronic books from the registration contents of the encryption table 23a. Accordingly, even in the event that the contents of the encryption table 23a has externally been leaked, it is difficult for an attacker or the like to recognize a rule regarding what kind of decryption parameters are used for decrypting each block of the electronic books. Therefore, interpretation of data can further be complicated.

The decompressing unit 26b decompresses each block of an electronic book file using the LZ77 compression method employing the slide window 30.

The display control unit 26c controls the display of the output unit 10 so as to display the search results as to an electronic book. For example, the display control unit 26c searches items from the decompressed file including a keyword and displays items obtained as the search results on the output unit 10.

The control unit 26 includes an integrated circuit such as an ASIC (Application Specific Integrated Circuit) or FPGA (Field Programmable Gate Array) or the like. Note that the control unit 26 may include an electronic circuit such as a CPU (Central Processing Unit) or MPU (Micro Processing Unit) or the like.

Figure 14:
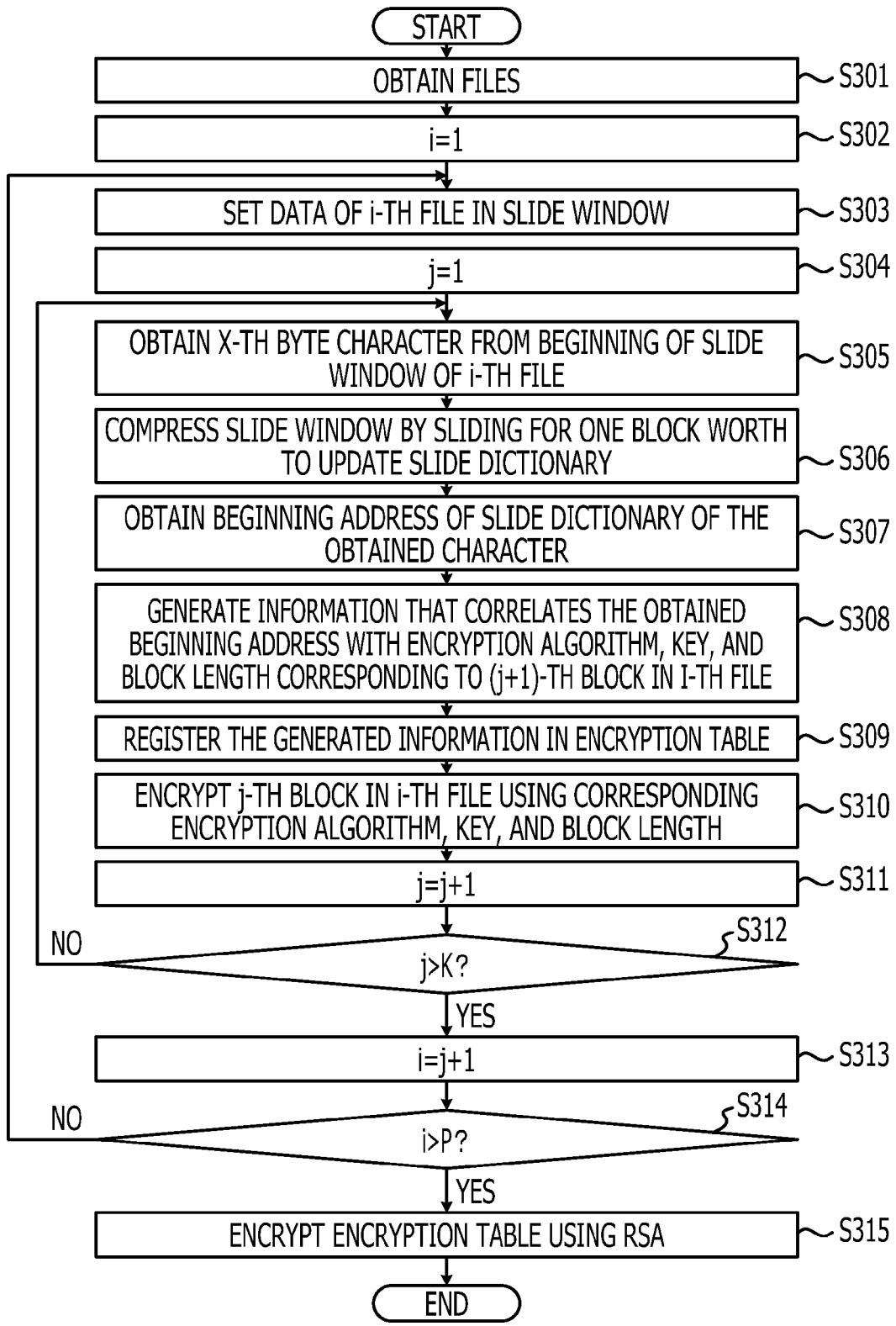
FIG. 14 is a flowchart illustrating a procedure example of compression and encryption processing according to the second embodiment.

Next, the flow of processing of the server 21 according to the present embodiment will be described. FIG. 14 is a flowchart illustrating a procedure of compression and encryption processing according to the second embodiment. This compression and encryption processing is executed in the event that instructions for executing the compression and encryption processing have been input from the input unit 4 to the control unit 24.

As illustrated in FIG. 14, the compressing unit 24b obtains multiple electronic book files from the storage unit 23 (S301). The compressing unit 24b sets 1 as the value of the variable i (S302). The compressing unit 24b sets the data of the i-th file in the slide window 30 (S303). The compressing unit 24b sets 1 as the value of the variable j (S304).

The generating unit 24a obtains a predetermined X-th byte character from the beginning of the encryption portion 32 in the event that the beginning character of the j-th block in the i-th file has been set in the beginning of the encryption portion 32 (S305). The compressing unit 24b slides the slide window 30 for one block worth using the LZ77 compression method employing the slide window 30 to compress the j-th block in the i-th file (S306). The generating unit 24a obtains an address from the beginning of the reference portion 31 where the obtained character is positioned (S307). The generating unit 24a generates information that correlates the obtained address with encryption parameters such as the encryption algorithm, key, and block length to be used for encryption of the next (j+1)-th block (S308). The generating unit 24a registers the generated information in the encryption table 23a (S309).

The first encryption unit 24c and second encryption unit 24d encrypts the j-th block in the i-th file (S310). Here, in the event that the value of the variable j is 1, the first encryption unit 24c encrypts the first block of an electronic book file. Also, in the event that the value of the variable j is equal to or greater than 2, the second encryption unit 24d encrypts the j-th block using encryption parameters indicated by the information generated by the generating unit 24a to be used for encryption of the j-th block.

The compressing unit 24b increments the value of the variable j by one (S311). The compressing unit 24b determines whether or not the value of the variable j exceeds the number K of blocks divided from the i-th file (S312). In the event that the value of the variable j does not exceed the number K (No in S312), the flow returns to S305.

On the other hand, in the event that the value of the variable j exceeds the number K (Yes in S312), the compressing unit 24b increments the value of the variable i by one (S313). The compressing unit 24b determines whether or not the value of the variable i exceeds the number P of electronic book files (S314). In the event that the value of the variable i does not exceed the number P (No in S314), the flow returns to S303. On the other hand, in the event that the value of the variable i exceeds the number P (Yes in S314), the second encryption unit 24d encrypts the encryption table 23a using RSA, and stores the encrypted encryption table 23a in the storage unit 23 (S315), and the processing is ended.

Figure 15:
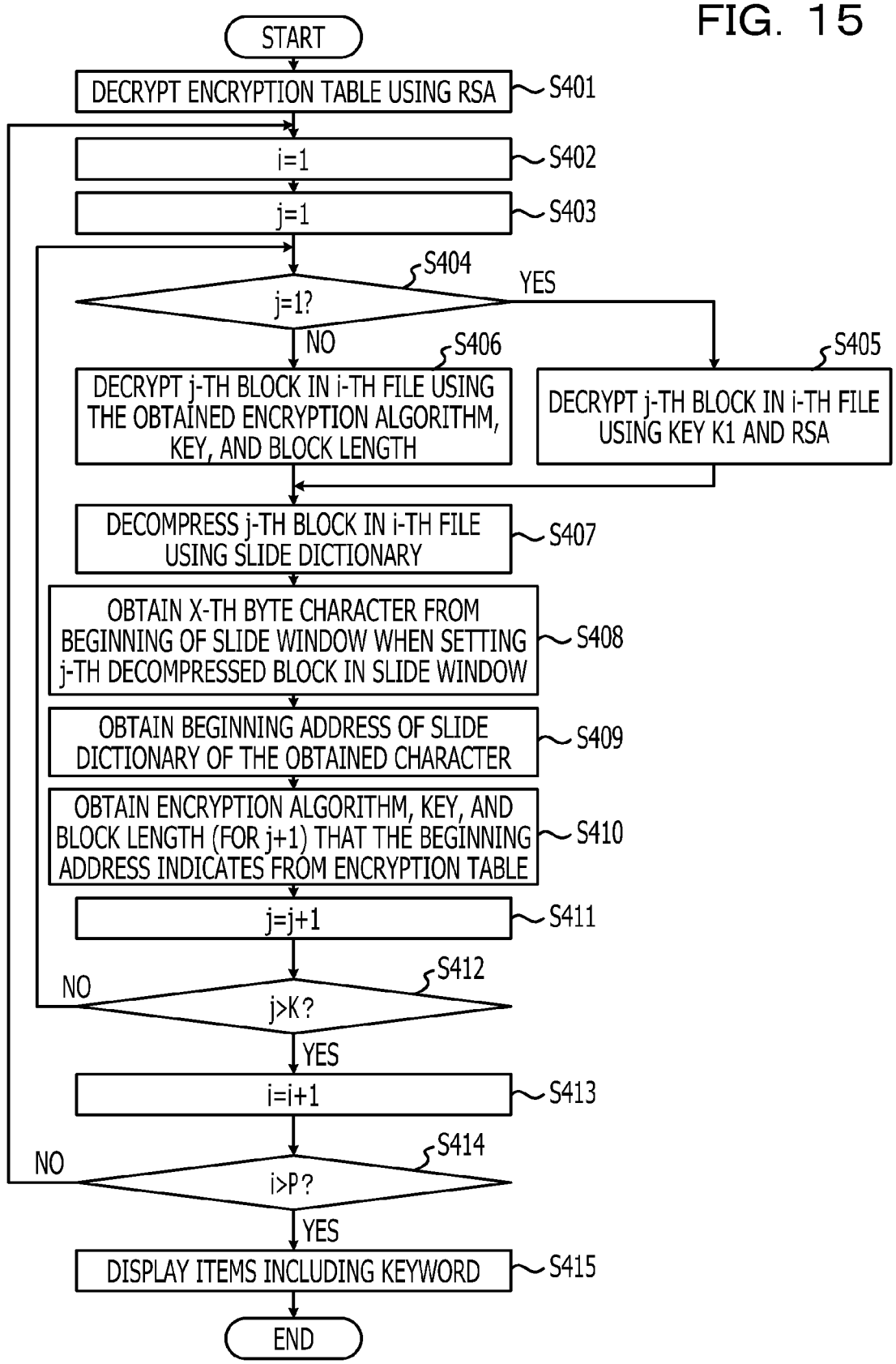
FIG. 15 is a flowchart illustrating a procedure example of search processing according to the second embodiment.

Next, the flow of the processing of the user terminal 22 according to the present embodiment will be described. FIG. 15 is a flowchart illustrating a procedure of search processing according to the second embodiment. This search processing is executed in the event that a search keyword and instructions for executing the search processing have been input from the input unit 9 to the control unit 26.

As illustrated in FIG. 15, the decryption unit 26a decrypts the encrypted encryption table 23a received from the server 21 using RSA (S401). The decompressing unit 26b sets 1 as the value of the variable i (S402). The decompressing unit 26b sets 1 as the value of the variable j (S403).

The decryption unit 26a determines whether or not the value of the variable j is 1 (S404). In the event that the value of the variable j is 1 (Yes in S404), the decryption unit 26a decrypts the first block in the i-th file with a predetermined key K1 and 1024-bit block length using the RSA algorithm (S405). On the other hand, in the event that the value of the variable j is not 1 (No in S404), the decryption unit 26a decrypts the j-th block using decryption parameters corresponding to the j-th block in the i-th file obtained in later-described S410 (S406). The decompressing unit 26b slides the slide window 30 to decompress the j-th block (S407). The decompressing unit 26a obtains a predetermined X-th byte character from the beginning of the encryption portion 32 in the event that the beginning character of the decompressed j-th block has been set in the beginning of the encryption portion 32 (S408).

The decryption unit 26a obtains an address indicating the position of the character obtained in S408 which is an address from the beginning of the reference portion 31 of the slide window 30 slid for decompressing the j-th block (S409). The decryption unit 26a obtains decryption parameters corresponding to the address form the encryption table 23a stored in the storage unit 25 as decryption parameters to be used for decryption of the next (j+1)-th block (S410). The decryption unit 26a increments the value of the variable j by one (S411). The decryption unit 26a determines whether or not the value of the variable j exceeds the above-mentioned number K (S412).

In the event that the value of the variable j does not exceed the number K (No in S412), the flow returns to S404. On the other hand, in the event that the value of the variable J exceeds the number K (Yes in S412), the decryption unit 26a increments the value of the variable i by one (S413). The decryption unit 26a determines whether or not the value of the variable i exceeds the number P (S414). In the event that the value of the variable i does not exceed the number P (No, S414), the flow returns to S402. On the other hand, in the event that the value of the variable i exceeds the number P (Yes, S414), the display control unit 26c displays items including a keyword on the output unit 10 out of the decompressed file (S415), and the processing is ended.

As described above, the server 21 according to the present embodiment generates information that correlates the data of a predetermined character of the j-th block included in a file to be encrypted, with the encryption algorithm, key, and block length. The server 21 according to the present embodiment encrypts the j-th block using a predetermined key or a key correlated with the data of a predetermined character of the (j−1)-th block. Next, the server 21 according to the present embodiment encrypts the (j+1)-th block having a data size that the block length correlated with the data of a predetermined character of the j-th block indicates using a key correlated with the data of a predetermined character of the j-th block. In this way, the server 21 according to the present embodiment generates information that correlates a character positioned in a predetermined location of the j-th block with encryption parameters to be used for encryption of the (j+1)-th block. Here, it is difficult to recognize a character positioned in a predetermined location of each block from an electronic book file to be encrypted or the generated information. Therefore, it is difficult to recognize what kind of encryption parameters each block in a file is encrypted with, from the generated information. Accordingly, even in the event that the generated information has externally been leaked, it is difficult for an attacker or the like to recognize a rule regarding what kind of encryption parameters are used for encrypting each block in a file. Therefore, it is also difficult for an attacker or the like to decrypt an encrypted file. Therefore, according to the server 21 according to the present embodiment, interpretation of data can further be complicated.

Also, the server 21 according to the present embodiment compresses each block using the slide window 30 for converting the data of a character into the data of compression code. The server 21 according to the present embodiment generates information that correlates the data of a character stored in the slide window 30 with the encryption parameters of the next block. Accordingly, according to the server 21 according to the present embodiment, compression and encryption can be realized in increments of blocks, and accordingly, compression and encryption can be performed using a compression buffer having smaller storage capacity. Also, processing cost for encryption processing or decryption processing can be suppressed while encryption data has interpretation difficulty.

Also, the user terminal 22 according to the present embodiment decrypts the j-th block included in an electronic book file to be decrypted using a predetermined key or a key correlated with the data of a predetermined character of the (j−1)-th block. Also, the user terminal 22 according to the present embodiment decrypts the (j+1)-th block included in the electronic book file to be decrypted using a key correlated with the data of a predetermined character of the j-th block. The user terminal 22 according to the present embodiment performs decryption of a block using information that correlates the address of a character positioned in a predetermined location of the j-th block to be used for decryption with decryption parameters to be used for decryption of the (j+1)-th block following the j-th block. Here, it is difficult to recognize an address corresponding to each block from an electronic book file or information to be used for decryption of a block. Therefore, it is difficult to recognize what kind of decryption parameters are used for decrypting each block of an electronic book from information to be used for decryption of a block. Accordingly, even in the event that the contents of the encryption table 23a stored in the storage unit 25 has externally been leaked, it is difficult for an attacker or the like to recognize a rule regarding what kind of decryption parameters each block in an electronic book is decrypted with. Therefore, interpretation of data can further be complicated.

Next, a third embodiment will be described.

Figure 16:
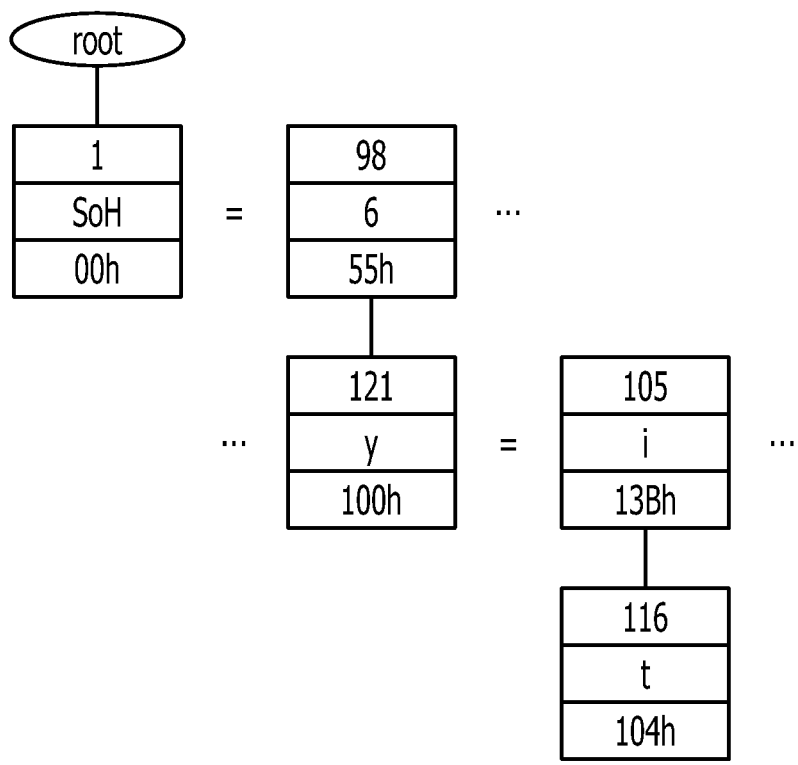
FIG. 16 illustrates an example of a trie (prefix tree)

With the above-mentioned second embodiment, though a case employing the LZ77 compression method has been exemplified, the disclosed device is not restricted to this. Therefore, with the third embodiment, a case employing an LZ78 compression method will be described. With the LZ78 compression method, a dynamic dictionary, i.e., a so-called trie (prefix tree) is generated, and encryption/decryption of each block is performed using the generate trie. Note that character code, a character, and a reference number are stored in leafs and nodes of a trie. FIG. 16 is a diagram illustrating an example of a trie. With the example in FIG. 16, the reference number of a character string "bit" is "104" in hexadecimal. With the example in FIG. 16, the reference number "104" is employed as a compression code string of the character string "bit", whereby the character string "bit" can be compressed. Also, with the example in FIG. 16, the data "104" of a compressed file is replaced with the character string "bit", whereby decompression thereof can be performed.

Figure 17:
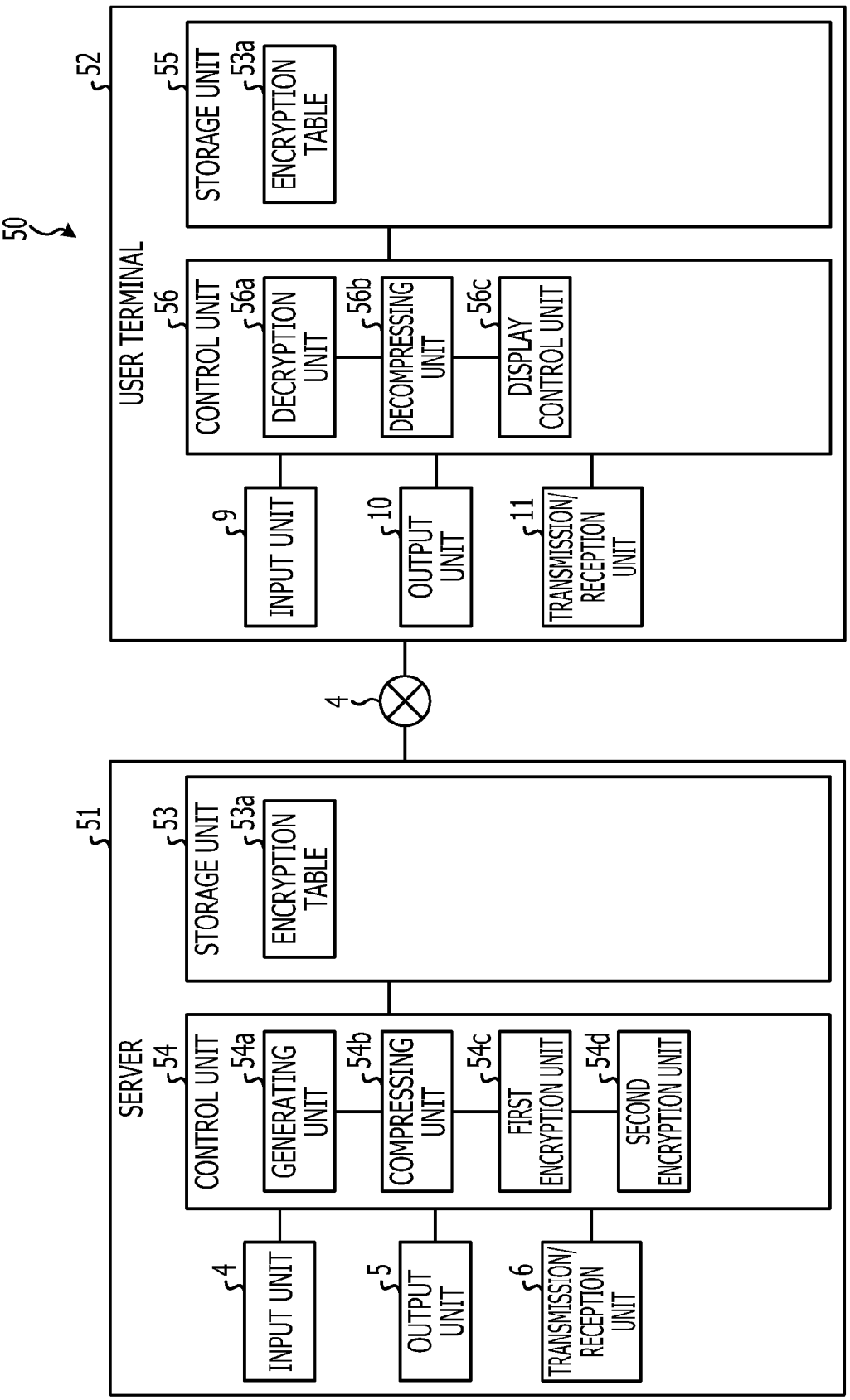
FIG. 17 illustrates an example of the configuration of a system according to a third embodiment.

FIG. 17 is a diagram illustrating an example of the configuration of a system according to the third embodiment. As illustrated in FIG. 17, a system 50 includes a server 51 instead of the server 2 according to the first embodiment, and a user terminal 52 instead of the user terminal 3. Note that, hereafter, the units and the devices which accomplish the same functions as with the first and second embodiments are denoted with the same reference numerals as with FIGS. 1 and 10, and description thereof may be omitted.

The server 51 includes an input unit 4, an output unit 5, a transmission/reception unit 6, a storage unit 53, and a control unit 54.

The transmission/reception unit 6 is a communication interface for performing communication between the server 51 and the user terminal 52. For example, upon receiving a later-described encryption table 53a from the control unit 54, the transmission/reception unit 6 transmits the received encryption table 53a to the user terminal 52 via the Internet 80. Also, upon receiving an encrypted electronic book from the control unit 54, the transmission/reception unit 6 transmits the received electronic book to the user terminal 52 via the Internet 80.

The storage unit 53 stores various types of information. For example, the storage unit 53 stores the encryption table 53a.

With the encryption table 53a, in the same way as with the encryption table 7a according to the first embodiment, in the event of encrypting the blocks, algorithm information indicating an encryption algorithm to be used for encryption, key information indicating a key, and block length information indicating block length are registered. Also, with the encryption table 53a, according to a later-described generating unit 54a, the reference number of a leaf of the trie in which the obtained character is stored is registered in a manner correlated with the algorithm information, key information, and block length. Thus, a leaf of the trie in which a character corresponding to each block is stored is correlated with the algorithm information, key information, and block length.

Here, a combination of an encryption algorithm, a key, and block length to be registered in the encryption table 53a is the same as a combination of an encryption algorithm, a key, and block length to be registered in the encryption tables 7a and 23a according to the first and second embodiments, and accordingly, description thereof will be omitted.

FIG. 18 is a diagram illustrating an example of an encryption table. The example in FIG. 18 illustrates a case where an encryption algorithm "α", a key "a", block length "$n_X$", and a reference number "X" are correlated. Also, the example in FIG. 18 illustrates a case where an encryption algorithm "β", a key "b", block length "$n_Z$", and a head address "Z" are correlated.

The storage unit 53 is a semiconductor memory device such as flash memory, or a storage device such as a hard disk or optical disc, for example. Note that the storage unit 53 is not restricted to the above kinds of storage devices, and may be RAM (Random Access Memory) or ROM (Read Only Memory).

The control unit 54 includes internal memory for storing a program or control data which stipulates various types of processing procedures, and executes various types of processing using these. As illustrated in FIG. 17, the control unit 54 includes a generating unit 54a, a compressing unit 54b, a first encryption unit 54c, and a second encryption unit 54d.

The generating unit 54a obtains one character out of a character string of a block divided from an electronic book file. In the event that a block has been compressed by a later-described compressing unit 54b, and the trie has been updated, the generating unit 54a then obtains the reference number of a leaf of the trie in which the obtained character is stored. Next, the generating unit 54a generates information that correlates the obtained reference number with encryption parameters to be used for encryption of the next block, and registers the generated information in the encryption table 53a. The generating unit 54a performs such processing on each block of each file of multiple electronic books. The generating unit 54a can employ the above-mentioned EXOR, bit transposition, digit transposition, byte transposition, DES, triple DES, AES, and RSA as an encryption algorithm to be used for encryption of the next block. Note that an encryption algorithm to be used for encryption is not restricted to these. Also, the block length of each block, and an encryption algorithm and a key which are used for encryption of each block are defined beforehand, and the generating unit 54a generates information that correlates a leaf number with encryption parameters for each block in accordance with the defined information thereof. The user can define the block length of each block, and an encryption algorithm and a key which are used for encryption of each block via the input unit 4.

Figure 19:
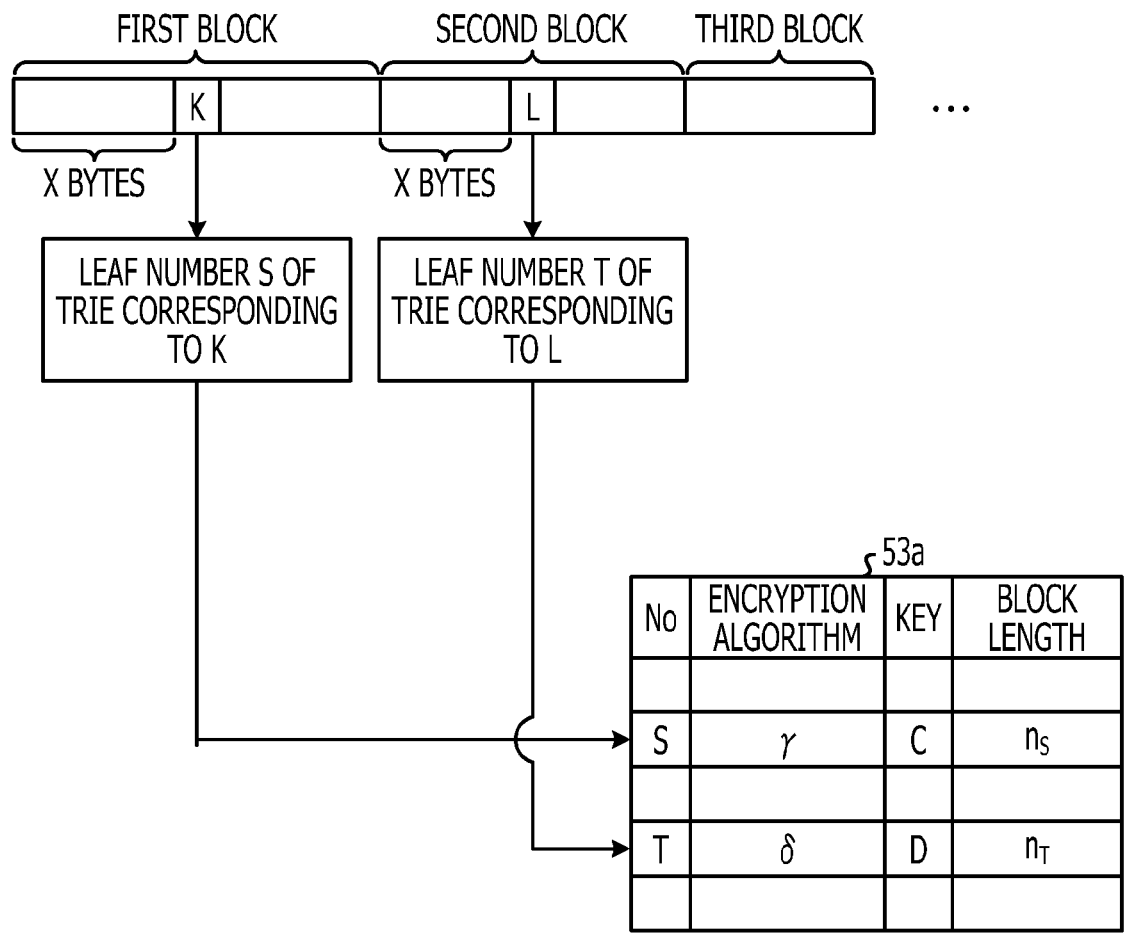
FIG. 19 illustrates an example of sever processing.

FIG. 19 is a diagram for describing an example of server processing. With the example in FIG. 19, the generating unit 54a obtains a predetermined X-th byte character "K" from the beginning of the first block of an electronic book file. With the example in FIG. 19, the generating unit 54a obtains a leaf reference number "S" of the trie in which the character "K" is stored. Next, with the example in FIG. 19, the generating unit 54a generates information that correlates the obtained leaf reference number "S" with the encryption algorithm "γ", key "C", and block length "$n_S$" to be used for encryption of the second block that is the next block. With the example in FIG. 19, the generating unit 54a registers the information that correlates the leaf reference number "S" with the encryption algorithm "γ", key "C", and block length "$n_S$", in the encryption table 53a.

Also, with the example in FIG. 19, the generating unit 54a obtains a predetermined X-th byte character "L" from the beginning of the second block of an electronic book file. With the example in FIG. 19, the generating unit 54a obtains a leaf reference number "T" of the trie in which the character "L" is stored. Next, with the example in FIG. 19, the generating unit 54a generates information that correlates the obtained leaf reference number "T" with an encryption algorithm "δ", key "D", and block length "$n_T$" to be used for encryption of the third block that is the next block. With the example in FIG. 19, the generating unit 54a registers the information that correlates the leaf reference number "T" with the encryption algorithm "δ", key "D", and block length "$n_T$", in the encryption table 53a.

In this way, the generating unit 54a obtains a character positioned in a predetermined location of the j-th block, and in the event that the j-th block has been compressed by the compressing unit 54b and the trie has been updated, obtains a leaf reference number of the trie in which the character is stored. The generating unit 54a then generates information that correlates the obtained reference number with encryption parameters to be used for encryption of the (j+1)-th block following the j-th block. The generating unit 54a then registers the generated information in the encryption table 53a. Here, it is difficult to recognize a reference number corresponding to each block from an electronic book file or the generated information. Therefore, it is difficult to recognize what kind of encryption parameters are used for encrypting each block of an electronic book from the registration contents of the encryption table 53a. Accordingly, even in the event that the contents of the encryption table 53a has externally been leaked, it is difficult for an attacker or the like to recognize a rule regarding what kind of encryption parameters are used for encrypting each block of an electronic book. Therefore, it is also difficult for an attacker or the like to decrypt an encrypted electronic book. Therefore, according to the generating unit 54a, interpretation of data can further be complicated.

The compressing unit 54b compresses the blocks of an electronic book file using the LZ78 compression method employing the trie.

The first encryption unit 54c encrypts the first block of an electronic book file. For example, the first encryption unit 54c encrypts the first block with a predetermined key and block length using an encryption algorithm of DES, triple DES, AES, or RSA which is high in encryption intensity as compared to EXOR, bit transposition, digit transposition, and byte transposition.

Hereafter, description will be made with reference to a case where the first encryption unit 54c encrypts the first block compressed by the compressing unit 54b with a predetermined key K1 and 1024-bit block length using the RSA encryption algorithm.

The second encryption unit 54d encrypts the j-th block of the second block and thereafter of an electronic book file using encryption parameters to be used for encryption of the j-th block that the information generated by the generating unit 54a indicates.

With the example in FIG. 19, the second encryption unit 54d encrypts the second block compressed by the compressing unit 54b with the encryption algorithm "γ", key "C", and block length "$n_S$". Also, with the example in FIG. 19, the second encryption unit 54d encrypts the third block compressed by the compressing unit 54b with the encryption algorithm "δ", key "D", and block length "$n_T$".

Also, the second encryption unit 54d encrypts the encryption table 53a using RSA, and stores the encrypted encryption table 53a in the storage unit 53. Also, upon receiving instructions for transmitting the encryption table 53a from the user terminal 52, the second encryption unit 54d transmits the encryption table 53a stored in the storage unit 53 to the user terminal 52 via the transmission/reception unit 6 and Internet 80. Also, upon receiving instructions for transmitting an electronic book from the user terminal 52, the second encryption unit 54d transmits an electronic book stored in the storage unit 53 to the user terminal 52 via the transmission/reception unit 6 and Internet 80.

The control unit 54 includes an integrated circuit such as an ASIC (Application Specific Integrated Circuit) or FPGA (Field Programmable Gate Array) or the like. Note that the control unit 54 may include an electronic circuit such as a CPU (Central Processing Unit) or MPU (Micro Processing Unit) or the like.

Now, description will return to FIG. 17. The user terminal 52 includes an input unit 9, an output unit 10, a transmission/reception unit 11, a storage unit 55, and a control unit 56.

The output unit 10 outputs various types of information. For example, the output unit 10 displays items searched with a keyword using a display control unit 56c. Device examples of the output unit 10 include display devices such as an LCD (Liquid Crystal Display), a CRT (Cathode Ray Tube), and so forth.

The transmission/reception unit 11 is a communication interface for performing communication between the user terminal 52 and the server 51. For example, upon receiving instructions for transmitting the encryption table 53a from the control unit 56, the transmission/reception unit 11 transmits the received instructions to the server 51 via the Internet 80. Also, upon receiving the encryption table 53a encrypted by RSA from the server 51, the transmission/reception unit 11 transmits the received encryption table 53a to the control unit 56. Also, upon receiving instructions for transmitting an electronic book from the control unit 56, the transmission/reception unit 11 transmits the received instructions to the server 51 via the Internet 80. Also, upon receiving an electronic book transmitted from the server 51, the transmission/reception unit 11 transmits the received electronic book to the control unit 56.

The storage unit 55 stores various types of information. For example, the encryption table 53a decrypted by a later-described decryption unit 56a is stored in the storage unit 55.

The storage unit 55 is a semiconductor memory device such as flash memory, or a storage device such as a hard disk or optical disc, for example. Note that the storage unit 55 is not restricted to the above kinds of storage devices, and may be RAM (Random Access Memory) or ROM (Read Only Memory).

The control unit 56 includes internal memory for storing a program or control data which stipulates various types of processing procedures, and executes various types of processing using these. As illustrated in FIG. 17, the control unit 56 includes a decryption unit 56a, a decompressing unit 56b, and a display control unit 56c.

The decryption unit 56a decrypts the blocks of an electronic book file. An example of processing that the decryption unit 56a executes will be described. Upon receiving instructions for executing search processing via the input unit 9, the decryption unit 56a transmits instructions for transmitting an electronic book, and instructions for transmitting the encryption table 53a to the server 51 via the transmission/reception unit 11 and Internet 80. Upon receiving the encrypted encryption table 53a from the server 51, the decryption unit 56a decrypts the received encryption table 53a using RSA.

Also, the decryption unit 56a decrypts, with regard to an electronic book transmitted from the server 51, the first block of the file with a predetermined key K1 and 1024-bit block length using the RSA algorithm.

Also, the decryption unit 56a obtains one character out of the character string of the j-th block decompressed by a later-described decompressing unit 56b. The decryption unit 56a then obtains a leaf reference number of the trie in which the obtained character is stored. Next, the decryption unit 56a obtains the encryption parameters corresponding to the leaf reference number from the encryption table 53a stored in the storage unit 55 as decryption parameters to be used for decryption of the next (j+1)-th block. The decryption unit 56a then decrypts the (j+1)-th block of the electronic book file using the decryption parameters corresponding to the obtained (j+1)-th block.

Figure 20:
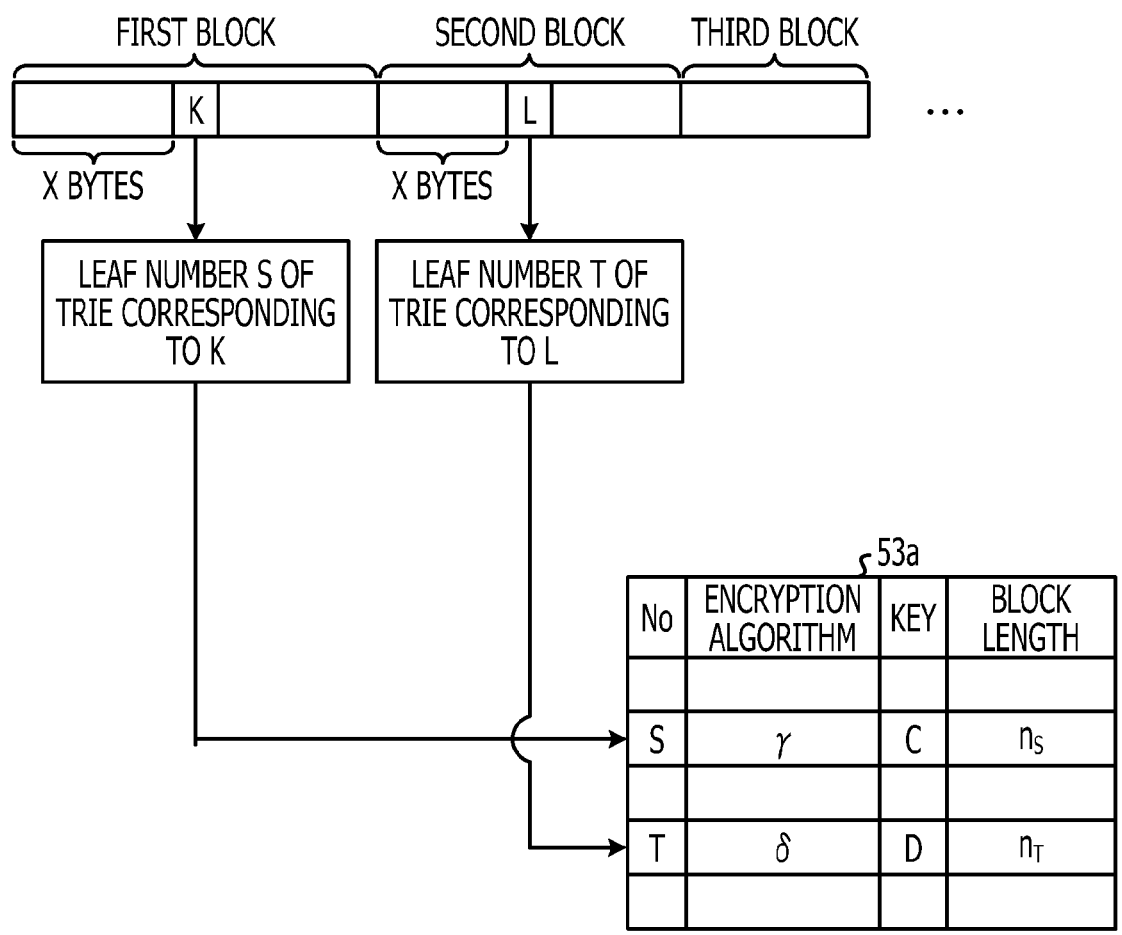
FIG. 20 illustrates an example of user-terminal processing.

FIG. 20 is a diagram for describing an example of user terminal processing. With the example in FIG. 20, the decryption unit 56a obtains a predetermined X-th byte character "K" from the beginning of the first block of the decrypted decompressed electronic book file. With the example in FIG. 20, the decryption unit 56a then obtains a leaf reference number "S" of the trie in which the character "K" is stored. Next, with the example in FIG. 20, the decryption unit 56a obtains the algorithm "γ", key "C", and block length "$n_S$" corresponding to the obtained leaf reference number "S" as decryption parameters to be used for decryption of the next second block. With the example in FIG. 20, the decryption unit 56a decrypts the second block of the encrypted electronic book file using the obtained algorithm "γ", key "C", and block length "$n_S$".

Also, with the example in FIG. 20, the decryption unit 56a obtains a predetermined X-th byte character "L" from the beginning of the second block of the decrypted decompressed electronic book file. With the example in FIG. 20, the decryption unit 56a then obtains a leaf reference number "T" of the trie in which the character "L" is stored. Next, with the example in FIG. 20, the decryption unit 56a obtains the algorithm "δ", key "D", and block length "$n_T$" corresponding to the obtained leaf reference number "T" as decryption parameters to be used for decryption of the next third block. With the example in FIG. 20, the decryption unit 56a decrypts the third block of the encrypted electronic book file using the obtained algorithm "δ", key "D", and block length "$n_T$".

In this way, with the encryption table 53a to be used for decryption, there is registered information that correlates the reference number of a leaf where a character positioned in a predetermined location of the j-th block is stored, with decryption parameters to be used for decryption of the (j+1)-th block following the j-th block. Here, it is difficult to recognize the reference number of a leaf corresponding to each block from an electronic book file or the registered information. Therefore, it is difficult to recognize what kind of decryption parameters are used for decrypting each block of the electronic book from the registration contents of the encryption table 53a. Accordingly, even in the event that the contents of the encryption table 53a stored in the storage unit 53 have externally been leaked, it is difficult for an attacker or the like to recognize a rule regarding what kind of decryption parameters are used for decrypting each block of the electronic book. Therefore, interpretation of data can further be complicated.

The decompressing unit 56b decompresses the blocks of an electronic book file using the LZ78 method employing the trie.

The display control unit 56c controls the display of the output unit 10 so as to display the search results as to an electronic book. For example, the display control unit 56c searches items from the decompressed file including a keyword and displays items obtained as the search results on the output unit 10.

The control unit 56 includes an integrated circuit such as an ASIC (Application Specific Integrated Circuit) or FPGA (Field Programmable Gate Array) or the like. Note that the control unit 56 may include an electronic circuit such as a CPU (Central Processing Unit) or MPU (Micro Processing Unit) or the like.

Figure 21:
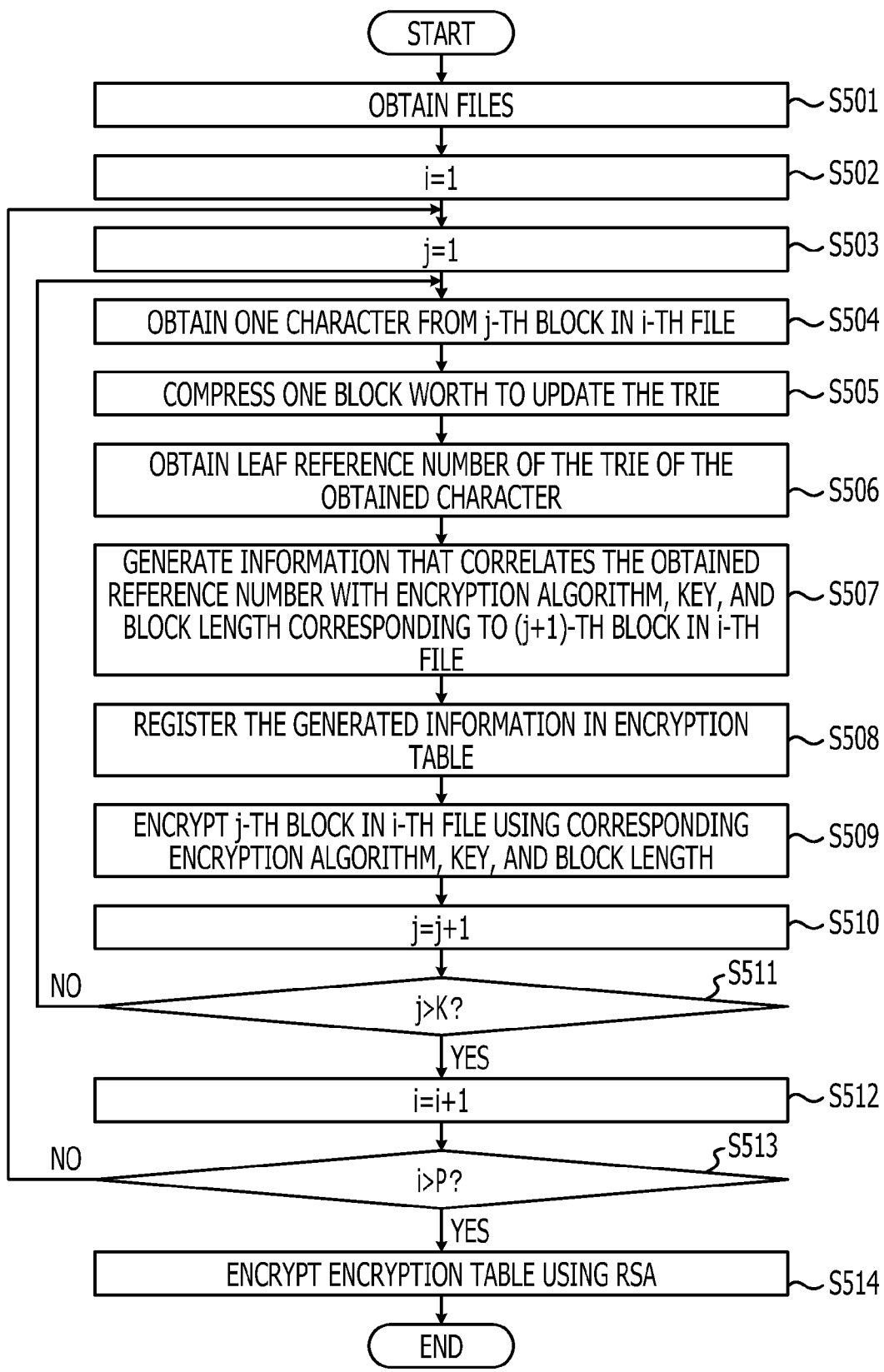
FIG. 21 is a flowchart illustrating a procedure example of compression and encryption processing according to the third embodiment.

Next, the flow of processing of the server 51 according to the present embodiment will be described. FIG. 21 is a flowchart illustrating a procedure of compression and encryption processing according to the third embodiment. This compression and encryption processing is executed in the event that instructions for executing the compression and encryption processing have been input from the input unit 4 to the control unit 54.

As illustrated in FIG. 21, the compressing unit 54b obtains multiple electronic book files from the storage unit 53 (S501). The compressing unit 54b sets 1 as the value of the variable i (S502). The compressing unit 54b sets 1 as the value of the variable j (S503).

The generating unit 54a obtains a character positioned in a predetermined location of the j-th block in the i-th file (S504). The compressing unit 54b compresses, according to the LZ78 compression method, the j-th block in the i-th file using the trie, and also updates the trie (S505). The generating unit 54a obtains a leaf reference number of the trie in which the obtained character is stored (S506). The generating unit 54a generates information that correlates the obtained reference number with encryption parameters such as the encryption algorithm, key, and block length to be used for encryption of the next (j+1)-th block (S507). The generating unit 54a registers the generated information in the encryption table 53a (S508).

The first encryption unit 54c or second encryption unit 54d encrypts the j-th block in the i-th file (S509). Here, in the event that the value of the variable j is 1, the first encryption unit 54c encrypts the first block of an electronic book file. Also, in the event that the value of the variable j is equal to or greater than 2, the second encryption unit 54d encrypts the j-th block using encryption parameters indicated by the information generated by the generating unit 54a to be used for encryption of the j-th block.

The compressing unit 54b increments the value of the variable j by one (S510). The compressing unit 54b determines whether or not the value of the variable j exceeds the number K of blocks divided from the i-th file (S511). In the event that the value of the variable j does not exceed the number K (No in S511), the flow returns to S504.

On the other hand, in the event that the value of the variable j exceeds the number K (Yes in S511), the compressing unit 54b increments the value of the variable i by one (S512). The compressing unit 54b determines whether or not the value of the variable i exceeds the number P of electronic book files (S513). In the event that the value of the variable i does not exceed the number P (No in S513), the flow returns to S503. On the other hand, in the event that the value of the variable i exceeds the number P (Yes in S513), the second encryption unit 54d encrypts the encryption table 53a using RSA, and stores the encrypted encryption table 53a in the storage unit 53 (S514), and the processing is ended.

Figure 22:
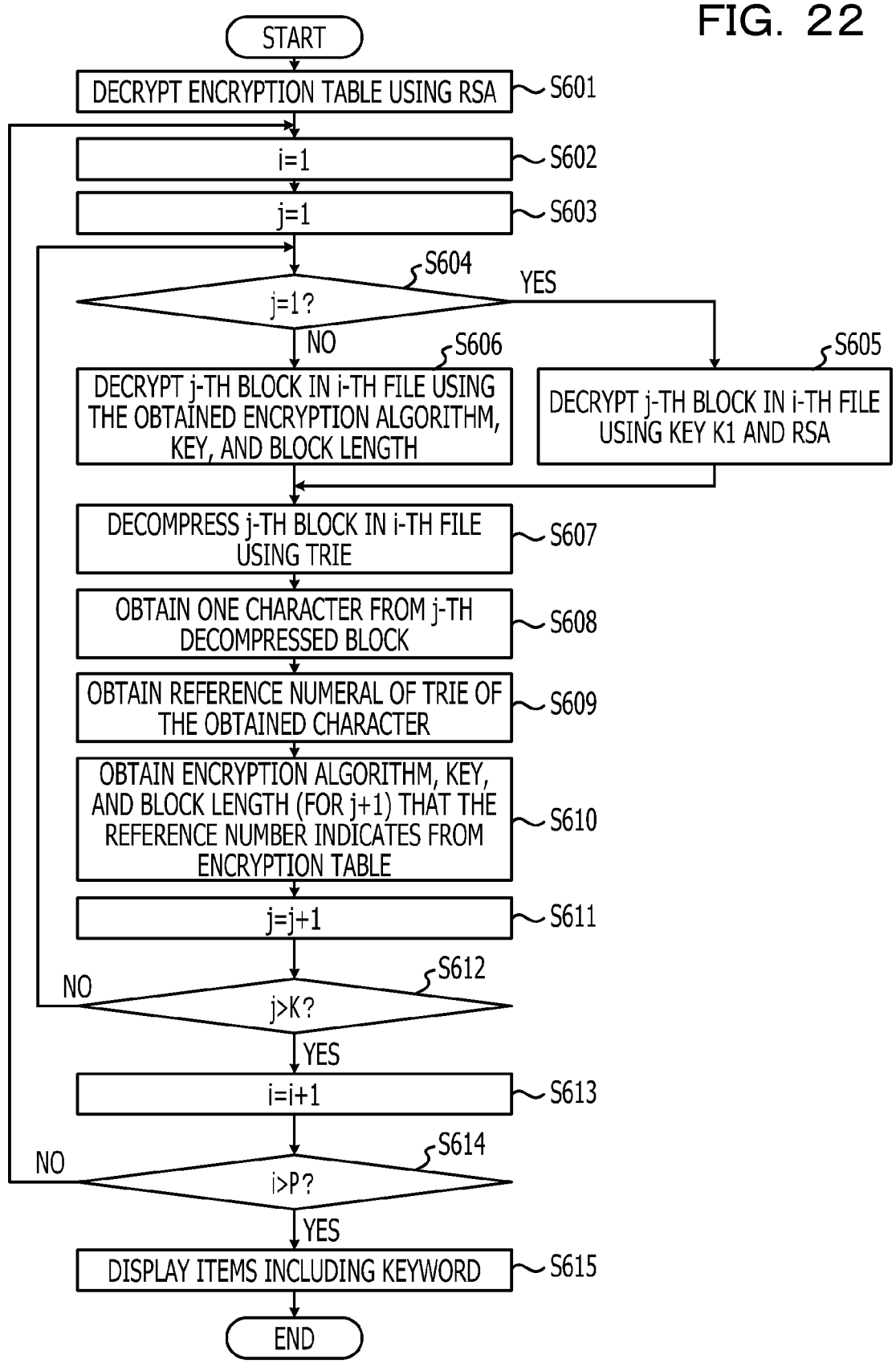
FIG. 22 is a flowchart illustrating a procedure example of search processing according to the third embodiment.

Next, the flow of the processing of the user terminal 52 according to the present embodiment will be described. FIG. 22 is a flowchart illustrating a procedure of search processing according to the third embodiment. This search processing is executed in the event that a search keyword and instructions for executing the search processing have been input from the input unit 9 to the control unit 56.

As illustrated in FIG. 22, the decryption unit 56a decrypts the encrypted encryption table 53a received from the server 51 using RSA (S601). The decompressing unit 56b sets 1 as the value of the variable i (S602). The decompressing unit 56b sets 1 as the value of the variable j (S603).

The decryption unit 56a determines whether or not the value of the variable j is 1 (S604). In the event that the value of the variable j is 1 (Yes in S604), the decryption unit 56a decrypts the first block in the i-th file with a predetermined key K1 and 1024-bit block length using the RSA algorithm (S605). On the other hand, in the event that the value of the variable j is not 1 (No in S604), the decryption unit 56a decrypts the j-th block using decryption parameters corresponding to the j-th block in the i-th file obtained in later-described S610 (S606). The decompressing unit 56b decompresses the j-th block using the trie according to the LZ77 compression method, and also updates the trie (S607). The decryption unit 56a obtains a character positioned in a predetermined location of the j-th block in the decompressed i-th file (S608).

The decryption unit 56a obtains a leaf reference number of the trie in which the obtained character is stored (S609). The decryption unit 56a obtains decryption parameters corresponding to the reference number from the encryption table 53a stored in the storage unit 55 as decryption parameters to be used for decryption of the next (j+1)-th block (S610). The decryption unit 56a increments the value of the variable j by one (S611). The decryption unit 56a determines whether or not the value of the variable j exceeds the above-mentioned number K (S612).

In the event that the value of the variable j does not exceed the number K (No in S612), the flow returns to S604. On the other hand, in the event that the value of the variable j exceeds the number K (Yes in S612), the decryption unit 56a increments the value of the variable i by one (S613). The decryption unit 56a determines whether or not the value of the variable i exceeds the number P (S614). In the event that the value of the variable i does not exceed the number P (No in S614), the flow returns to S602. On the other hand, in the event that the value of the variable i exceeds the number P (Yes in S614), the display control unit 56c displays items including a keyword on the output unit 10 out of the decompressed file (S615), and the processing is ended.

As described above, the server 51 according to the present embodiment generates information that correlates the data of a predetermined character of the j-th block included in a file to be encrypted, with the encryption algorithm, key, and block length. The server 51 according to the present embodiment encrypts the j-th block using a predetermined key or a key correlated with the data of a predetermined character of the (j−1)-th block. Next, the server 51 according to the present embodiment encrypts the (j+1)-th block having a data size that the block length correlated with the data of a predetermined character of the j-th block indicates using a key correlated with the data of a predetermined character of the j-th block. In this way, the server 51 according to the present embodiment generates information that correlates a character positioned in a predetermined location of the j-th block with encryption parameters to be used for encryption of the (j+1)-th block. Here, it is difficult to recognize a character positioned in a predetermined location of each block from an electronic book file to be encrypted or the generated information. Therefore, it is difficult to recognize what kind of encryption parameters each block in a file is encrypted with, from the generated information. Accordingly, even in the event that the generated information has externally been leaked, it is difficult for an attacker or the like to recognize a rule regarding what kind of encryption parameters are used for encrypting each block in a file. Therefore, it is also difficult for an attacker or the like to decrypt an encrypted file. Therefore, according to the server 51 according to the present embodiment, interpretation of data can further be complicated.

Also, the server 51 according to the present embodiment compresses each block using the trie for converting the data of a character into the data of compression code. The server 51 according to the present embodiment generates information that correlates the data of a character stored in a leaf of the trie with encryption parameters of the next block. Therefore, according to the server 51 according to the present embodiment, compression and encryption can be realized in increments of blocks, and accordingly, compression and encryption can be performed using a compression buffer having smaller storage capacity. Also, processing cost for encryption processing or decryption processing can be suppressed while encryption data has interpretation difficulty.

Also, the user terminal 52 according to the present embodiment decrypts the j-th block included in a file to be decrypted using a predetermined key or a key correlated with the data of a predetermined character of the (j−1)-th block. Also, the user terminal 52 according to the present embodiment decrypts the (j+1)-th block included in the file to be decrypted using a key correlated with the data of a predetermined character of the j-th block. The user terminal 52 according to the present embodiment performs decryption of a block using information that correlates the reference number of a leaf where a character positioned in a predetermined location of the j-th block to be used for decryption is stored, with decryption parameters to be used for decryption of the (j+1)-th block following the j-th block. Here, it is difficult to recognize the reference number of a leaf corresponding to each block from an electronic book file or information to be used for decryption. Therefore, it is difficult to recognize what kind of decryption parameters are used for decrypting each block of an electronic book from information to be used for decryption. Accordingly, even in the event that the contents of the encryption table 53a stored in the storage unit 55 has externally been leaked, it is difficult for an attacker or the like to recognize a rule regarding what kind of decryption parameters each block in an electronic book is decrypted with. Therefore, interpretation of data can further be complicated.

Now, though the embodiments regarding the disclosed device has been described so far, the present disclosure may be implemented in various different modes other than the above-mentioned embodiments. Therefore, hereafter, other embodiments encompassed in the present disclosure will be described.

For example, of the processes described in the first through third embodiments, the entirety or part of a process that has been described so as to be automatically performed may also manually be performed. Also, of the processes described in the present embodiment, the entirety or part of a process that has been described so as to be manually performed may also automatically be performed using a known method. For example, in steps S101, S301, and S501, the user inputs an electronic book file to the control unit 8 via the input unit 4, whereby the control unit 8 can obtain the file.

Also, according to various types of load, use situations, and so forth, the processing in each step of each process described in each embodiment may optionally be divided finely, or may be summarized. Also, steps may be omitted. For example, steps S113 and S114 are summarized, and accordingly, the compressing unit 8b can increment the value of the variable j by one, and determine whether or not the value of the variable j exceeds the number K of blocks divided from the i-th file.

Also, according to various types of load, use situations, and so forth, the processing sequence of the steps of each process described in each embodiment may be changed. For example, before the processing in S102, the processing in S103 can be performed.

Also, the components of the devices illustrated in the drawing are something functionally conceptual, and might not be physically configured as illustrated in the drawing. That is to say, a specific state of distribution/integration of the devices is not restricted to the states in the drawing, and all or part thereof may be distributed/integrated in a functional or physical manner in optional increments according to various types of load or use situations or the like. For example, the first encryption unit and second encryption unit according to each of the first through third embodiments may be integrated to one encryption unit. Also, the decryption units according to the first through third embodiments may be taken as a first decryption unit configured to decrypt the first block of each file, and a second decryption unit configured to decrypt the second block and thereafter of each file.

Lastly, a fourth embodiment will be described.

Figure 23:
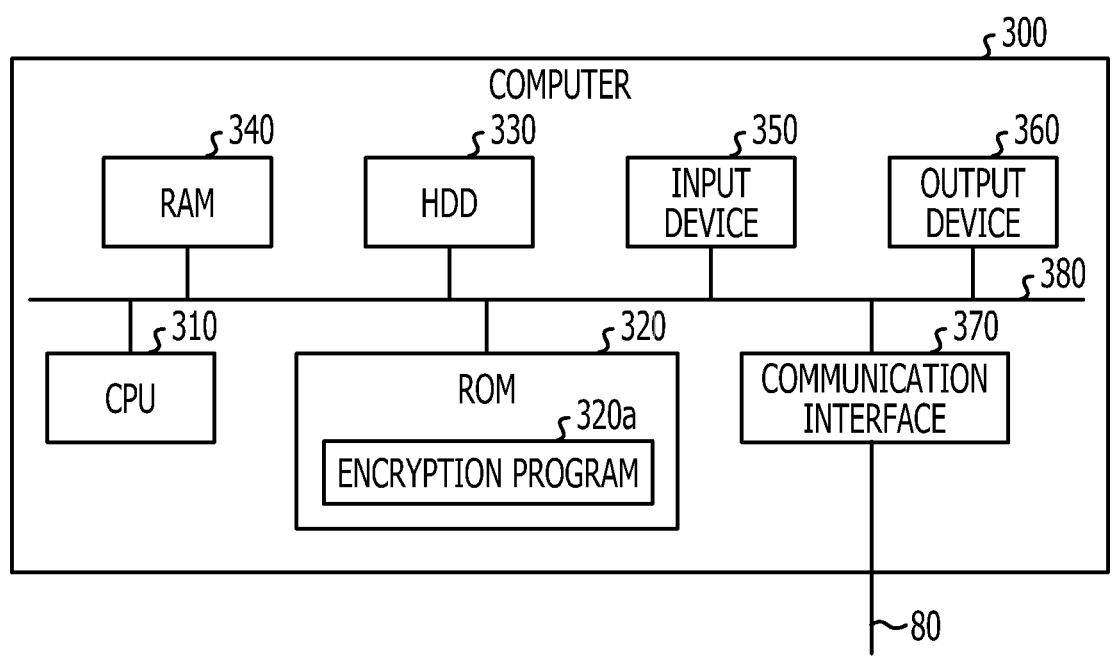
FIG. 23 illustrates a computer which executes an encryption program.
Figure 24:
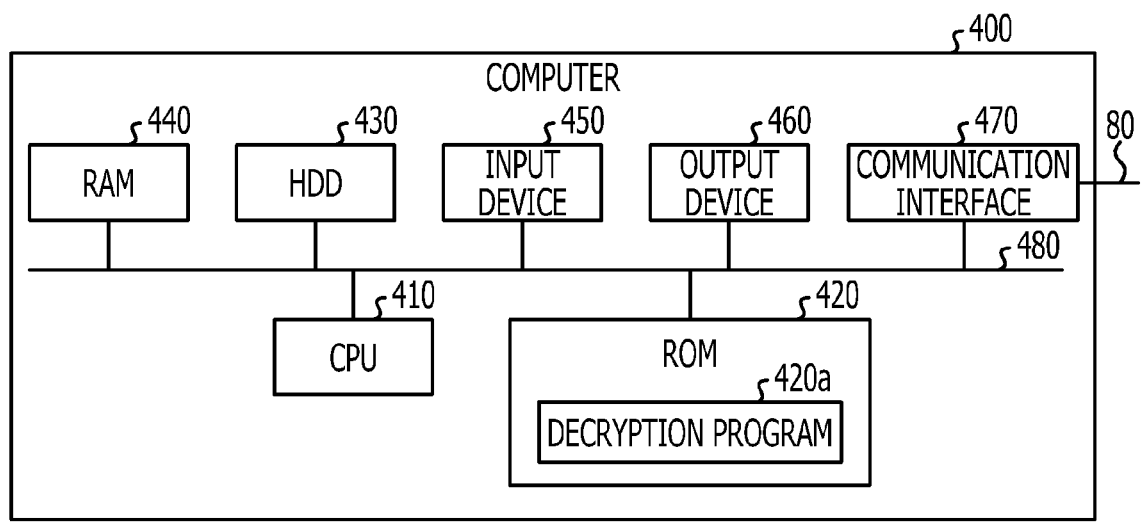
FIG. 24 illustrates a computer which executes a decryption program.

Various processes of the servers and user terminals described in the above first through third embodiments may also be realized by executing a prepared program at a computer system such as a personal computer or workstation or the like. Therefore, hereafter, description will be made with reference to FIGS. 23 and 24 regarding an example of a computer which executes an encryption program and a decryption program which have the same function as with the server and user terminal described in the above embodiments. FIG. 23 is a diagram illustrating a computer which executes an encryption program. Also, FIG. 24 is a diagram illustrating a computer which executes a decryption program.

As illustrated in FIG. 23, a computer 300 includes a CPU (Central Processing Unit) 310, ROM (Read Only Memory) 320, an HDD (Hard Disk Drive) 330, and RAM (Random Access Memory) 340. Also, the computer 300 includes an input device 350, an output device 360, and a communication interface 370 connected to the Internet 80. These units 310 through 370 are connected via a bus 380. The CPU 301 is an example of a processor which reads out and executes the at least one of the encryption program and the decryption program from the ROM 320. The processor is a hardware to carry out operations based on at least one program (such as the encryption program and the decryption program) and control other hardware, such as the CPU 301, a GPU (Graphics Processing Unit), FPU (Floating point number Processing Unit) and DSP (Digital signal Processor). The processor runs the program stored in the ROM or the hard disk and controls the respective hardware portions illustrated in FIGs, so as to implement respective functions by means of the control unit 8, 13, 24 and 26.

The input device 350 includes various input devices, e.g., such as a keyboard and a mouse. The input device 350 corresponds to the input unit 4 included in the server according to each embodiment.

The output device 360 includes various output devices, e.g., such as a liquid crystal display. The output device 360 corresponds to the output unit 5 included in the server according to each embodiment.

The communication interface 370 corresponds to the transmission/reception unit 6 included in the server according to each embodiment.

With the ROM 320, an encryption program 320a which exhibits the same functions as with the generating unit, compressing unit, first encryption unit, and second encryption unit indicated in the above embodiments is stored beforehand. Note that the encryption program 320a may be divided as appropriate.

The CPU 310 then executes the encryption program 320a by reading out from the ROM 320.

With the HDD 330, the encryption table, compression parameters, nodeless Huffman tree, and appearance map are provided. Of these, the compression parameters, nodeless Huffman tree, and appearance map correspond to the compression parameters 7b, nodeless Huffman tree 7c, and appearance map 7d, respectively. Also, the encryption table corresponds to any of the encryption table 7a, encryption table 23a, and encryption table 53a. Note that in the event that the encryption table corresponding to the encryption table 23a or encryption table 53a is provided in the HDD 330, none of the compression parameters, nodeless Huffman tree, nor appearance map may be provided in the HDD 330.

The CPU 310 reads out the encryption table, compression parameters, nodeless Huffman tree, and appearance map, and stores in the RAM 340. Further, the CPU 310 uses the encryption table, compression parameters, nodeless Huffman tree, and appearance map, which have been stored in the RAM 340, to execute the encryption program. Note that all of the data stored in the RAM 340 do not necessarily have to be stored in the RAM 340, and only data used for processing has to be stored in the RAM 340.

As illustrated in FIG. 24, a computer 400 includes a CPU 410, ROM 420, an HDD 430, and RAM 440. Also, the computer 400 includes an input device 450, an output device 460, and a communication interface 470 connected to the Internet 80. These units 410 through 470 are connected via a bus 480.

The input device 450 includes various input devices, e.g., such as a keyboard and a mouse. The input device 450 corresponds to the input unit 4 included in the server according to each embodiment.

The output device 460 includes various output devices, e.g., such as a liquid crystal display. The output device 460 corresponds to the output unit 5 included in the server according to each embodiment.

The communication interface 470 corresponds to the transmission/reception unit 6 included in the server according to each embodiment.

With the ROM 420, a decryption program 420a which exhibits the same functions as with the decryption unit and decompressing unit indicated in the above embodiments is stored beforehand. Note that the decryption program 420a may be divided as appropriate.

The CPU 410 then executes the decryption program 420a by reading out from the ROM 420.

With the HDD 430, the encryption table, compression parameters, nodeless Huffman tree, and appearance map are provided. Of these, the compression parameters, nodeless Huffman tree, and appearance map correspond to the compression parameters 7b, nodeless Huffman tree 7c, and appearance map 7d, respectively. Also, the encryption table corresponds to any of the encryption table 7a, encryption table 23a, and encryption table 53a. Note that in the event that the encryption table corresponding to the encryption table 23a or encryption table 53a is provided in the HDD 430, none of the compression parameters, nodeless Huffman tree, nor appearance map may be provided in the HDD 430.

The CPU 410 reads out the encryption table, compression parameters, nodeless Huffman tree, and appearance map, and stores in the RAM 440. Further, the CPU 410 uses the encryption table, compression parameters, nodeless Huffman tree, and appearance map, which have been stored in the RAM 440, to execute the decryption program.

Note that the above-mentioned encryption program and decryption program do not necessarily have to be stored in the ROM from the beginning.

For example, an arrangement may be made wherein a program is stored in a "portable physical medium" such as a flexible disk (FD), CD-ROM, DVD disc, magneto-optical disk, IC card, or the like to be inserted into the computer, and the computer then executes the program by reading out from this.

Further, an arrangement may be made wherein a program is stored in a "another computer (or server)" to be connected to the computer via a public line, the Internet, a LAN, a WAN, or the like, and the computer then reads out the program from these to execute this.

According to the above-mentioned embodiment, the processing cost for encryption processing or decryption processing can be suppressed while data has interpretation difficulty.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A non-transitory computer-readable recording medium storing an encryption program that causes a computer to execute a procedure, the procedure comprising:
 compressing a first data portion and a second data portion using dictionary information for converting a character into a corresponding compression code, each of the first data portion and the second data portion being included in data to be encrypted;

encrypting the first data portion and the second data portion;

encrypting first information used for decryption of the first data portion; and associating second information used for decryption of the second portion with a predetermined part of the first data portion wherein the second information is included in the dictionary information related to a character included in the predetermined part of the first data portion.

2. The recording medium according to claim 1, wherein the procedure further comprises:

generating an encrypted file including the encrypted first data portion, the encrypted second data portion, the encrypted first information and the second information in associated with the predetermined part of the first data portion.

3. The recording medium according to claim 1, wherein the second information indicates at least one of a data size of the second portion, a decryption key for the encrypted second data portion and an identification of a decryption algorithm corresponding to the encrypted second data portion.

4. The recording medium according to claim 1, wherein the first information indicates at least one of a data size of the first portion, a decryption key for the encrypted first data portion and an identification of a decryption algorithm corresponding to the encrypted first data portion.

5. The recording medium according to claim 4, wherein the second information is different from the first information.

6. An encryption method comprising:

compressing a first data portion and a second data portion using dictionary information for converting a character into a corresponding compression code, each of the first data portion and the second data portion being included in data to be encrypted;

encrypting the first data portion and the second data portion;

encrypting first information used for decryption of the first data portion; and associating second information used for decryption of the second portion with a predetermined part of the first data portion wherein the second information is included in the dictionary information related to a character included in the predetermined part of the first data portion.

7. The encryption method according to claim 6, further comprising:

generating an encrypted file including the encrypted first data portion, the encrypted second data portion, the encrypted first information and the second information associated with the predetermined part of the first data portion.

8. The encryption method according to claim 7, further comprising:

decrypting the encrypted first information;

decrypting the encrypted first data portion included in the file by using the decrypted first information;

extracting the second information based on the predetermined part of the decrypted first data portion from the generated encrypted file; and decrypting the encrypted second data portion by using the extracted second information.

9. An encryption apparatus comprising:

a memory that stores data to be encrypted; and a processor that executes a procedure, the procedure includes:

compressing a first data portion and a second data portion using dictionary information for converting a character into a corresponding compression code, each of the first data portion and the second data portion being included in data to be encrypted;

encrypting the first data portion and the second data portion;

encrypting first information used for decryption of the first data portion; and associating second information used for decryption of the second portion with a predetermined part of the first data portion wherein the second information is included in the dictionary information related to a character included in the predetermined part of the first data portion.

10. The encryption apparatus according to claim 9, wherein the procedure further includes:

generating an encrypted file including the encrypted first data portion, the encrypted second data portion, the encrypted first information and the second information associated with the predetermined part of the first data portion; and storing the generated encrypted file in the memory.

11. A non-transitory computer-readable recording medium storing a decryption program that causes a computer to execute a procedure, the procedure comprising:

receiving an encrypted file including an encrypted first data portion, an encrypted second data portion, encrypted first information and the second information in associated with a predetermined part of the first data portion, the first information is used for decryption of the first data portion and the second information is used for decryption of the second data portion, the first data portion and the second data portion being compressed using dictionary information for converting a character into a corresponding compression code, the second information being included in the dictionary information related to a character included in the predetermined part of the first data portion;

decrypting the encrypted first information;

decrypting the encrypted first data portion by using the decrypted first information;

extracting the second information based on the predetermined part of the decrypted first data portion from the encrypted file; and decrypting the encrypted second data portion by using the extracted second information.

12. A decryption method comprising:

receiving an encrypted file including an encrypted first data portion, an encrypted second data portion, encrypted first information and the second information in associated with a predetermined part of the first data portion, the first information is used for decryption of the first data portion and the second information is used for decryption of the second data portion, the first data portion and the second data portion being compressed using dictionary information for converting a character into a corresponding compression code, the second information being included in the dictionary information related to a character included in the predetermined part of the first data portion;

decrypting the encrypted first information;

decrypting the encrypted first data portion by using the decrypted first information;

extracting the second information based on the predetermined part of the decrypted first data portion from the encrypted file; and decrypting the encrypted second data portion by using the extracted second information.

13. A decryption apparatus comprising:

a memory that stores an encrypted file including an encrypted first data portion, an encrypted second data portion, encrypted first information and the second information in associated with a predetermined part of the first data portion, the first information is used for decryption of the first data portion and the second information is used for decryption of the second data portion, the first data portion and the second data portion being compressed using dictionary information for converting a character into a corresponding compression code, the second information being included in the dictionary information related to a character included in the predetermined part of the first data portion;

and a processor that executes a procedure, the procedure includes:

decrypting the encrypted first information;

decrypting the encrypted first data portion by using the decrypted first information;

extracting the second information based on the predetermined part of the decrypted first data portion from the encrypted file; and decrypting the encrypted second data portion by using the extracted second information.

14. A system comprising:

a first computer that executes a procedure, the procedure includes:

compressing a first data portion and a second data portion using dictionary information for converting a character into a corresponding compression code, each of the first data portion and the second data portion being included in data to be encrypted;

encrypting the first data portion and the second data portion;

encrypting first information used for decryption of the first data portion; and associating second information used for decryption of the second portion with a predetermined part of the first data portion;

wherein the second information is included in the dictionary information related to a character included in the predetermined part of the first data portion, and a second computer that executes another procedure, the another procedure includes:

decrypting the encrypted first information;

decrypting the encrypted first data portion by using the decrypted first information;

extracting the second information based on the predetermined part of the decrypted first data portion from the encrypted file; and decrypting the encrypted second data portion by using the extracted second information.

\* \* \* \* \*